US012147808B2

(12) United States Patent
Iwase et al.

(10) Patent No.: US 12,147,808 B2

(45) Date of Patent: Nov. 19, 2024

(54) INFORMATION PROCESSING DEVICE AND INFORMATION PROCESSING METHOD

(71) Applicant: SONY CORPORATION, Tokyo (JP)

(72) Inventors: Hiro Iwase, Tokyo (JP); Yuhei Taki, Tokyo (JP); Kunihito Sawai, Tokyo (JP)

(73) Assignee: SONY CORPORATION, Tokyo (JP)

(*) Notice: Subject to any disclaimer, the term of this patent is extended or adjusted under 35 U.S.C. 154(b) by 698 days.

(21) Appl. No.: 15/733,885

(22) PCT Filed: Mar. 8, 2019

(86) PCT No.: PCT/JP2019/009538

§ 371 (c)(1),
(2) Date: Nov. 30, 2020

(87) PCT Pub. No.: WO2019/235013

PCT Pub. Date: Dec. 12, 2019

(65) Prior Publication Data

US 2021/0224066 A1 Jul. 22, 2021

(30) Foreign Application Priority Data

Jun. 7, 2018 (JP) ................................. 2018-109314

(51) Int. Cl.
*G06F 9/30* (2018.01)
*G06F 3/16* (2006.01)
(Continued)

(52) U.S. Cl.
CPC ............ *G06F 9/3017* (2013.01); *G06F 3/165* (2013.01); *G06F 3/167* (2013.01); *G10L 15/063* (2013.01);
(Continued)

(58) Field of Classification Search
CPC ..... G06F 9/3017; G06F 3/165; G10L 15/063; G10L 15/22; G10L 2015/223
See application file for complete search history.

(56) References Cited

U.S. PATENT DOCUMENTS 10,540,976 B2 * 1/2020 Van Os .................. G06F 3/167
11,373,650 B2 * 6/2022 Suzuki ...................... G06F 3/14
(Continued)

FOREIGN PATENT DOCUMENTS

JP 2007-243602 A 9/2007
JP 2018-005061 A 1/2018

OTHER PUBLICATIONS

International Search Report and Written Opinion of PCT Application No. PCT/JP2019/009538, issued on May 21, 2019, 06 pages of ISRWO.

*Primary Examiner* — Mohammad K Islam
(74) *Attorney, Agent, or Firm* — CHIP LAW GROUP

(57) ABSTRACT

To automatically determine a more memorable macro name. Provided is an information processing device that comprises an utterance learning adaptation unit that executes clustering pertaining to a plurality of function execution instructions by a user and estimates, as a macro, a cluster that includes the plurality of function execution instructions and a response control unit that controls the presentation of information pertaining to the macro, wherein the utterance learning adaptation unit determines a name for the estimated macro on the basis of a context acquired at the time of issuing the plurality of function execution instructions included in the cluster, the response control unit controls a notification of the macro name to the user, and the plurality of function execution instructions include at least one function execution instruction issued via an utterance.

19 Claims, 17 Drawing Sheets

(51) Int. Cl.
*G10L 15/06* (2013.01)
*G10L 15/22* (2006.01)

(52) U.S. Cl.
CPC ........ *G10L 15/22* (2013.01); *G10L 2015/223* (2013.01)

(56) References Cited

U.S. PATENT DOCUMENTS

| | | | | |
|---|---|---|---|---|
| 11,688,268 | B2 * | 6/2023 | Saito | G10L 15/22 704/231 |
| 2013/0325759 | A1 * | 12/2013 | Rachevsky | G06F 18/2411 706/12 |
| 2014/0267933 | A1 | 9/2014 | Young | |
| 2015/0066479 | A1 * | 3/2015 | Pasupalak | G06F 16/90332 704/9 |
| 2015/0279360 | A1 * | 10/2015 | Mengibar | G10L 15/1815 704/257 |
| 2019/0259380 | A1 * | 8/2019 | Biyani | G10L 15/22 |
| 2022/0093101 | A1 * | 3/2022 | Krishnan | G10L 15/063 |
| 2022/0301566 | A1 * | 9/2022 | Van Os | G10L 15/26 |
| 2022/0350605 | A1 * | 11/2022 | Iwase | G06F 3/011 |

* cited by examiner

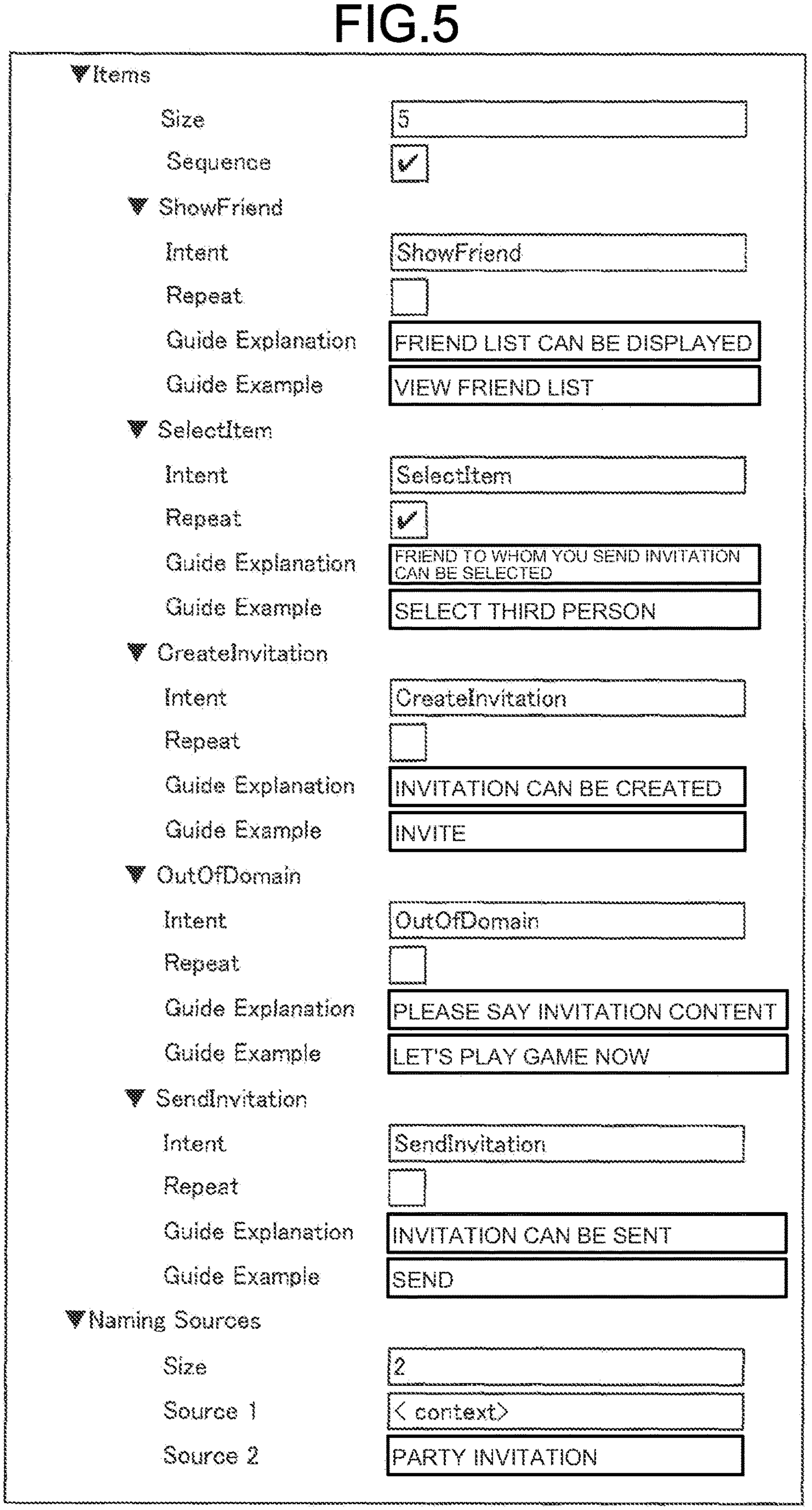

FIG.5

▼ Items
- Size: 5
- Sequence: ✓
- ▼ ShowFriend
  - Intent: ShowFriend
  - Repeat: ☐
  - Guide Explanation: FRIEND LIST CAN BE DISPLAYED
  - Guide Example: VIEW FRIEND LIST
- ▼ SelectItem
  - Intent: SelectItem
  - Repeat: ✓
  - Guide Explanation: FRIEND TO WHOM YOU SEND INVITATION CAN BE SELECTED
  - Guide Example: SELECT THIRD PERSON
- ▼ CreateInvitation
  - Intent: CreateInvitation
  - Repeat: ☐
  - Guide Explanation: INVITATION CAN BE CREATED
  - Guide Example: INVITE
- ▼ OutOfDomain
  - Intent: OutOfDomain
  - Repeat: ☐
  - Guide Explanation: PLEASE SAY INVITATION CONTENT
  - Guide Example: LET'S PLAY GAME NOW
- ▼ SendInvitation
  - Intent: SendInvitation
  - Repeat: ☐
  - Guide Explanation: INVITATION CAN BE SENT
  - Guide Example: SEND ▼ Naming Sources
- Size: 2
- Source 1: < context >
- Source 2: PARTY INVITATION

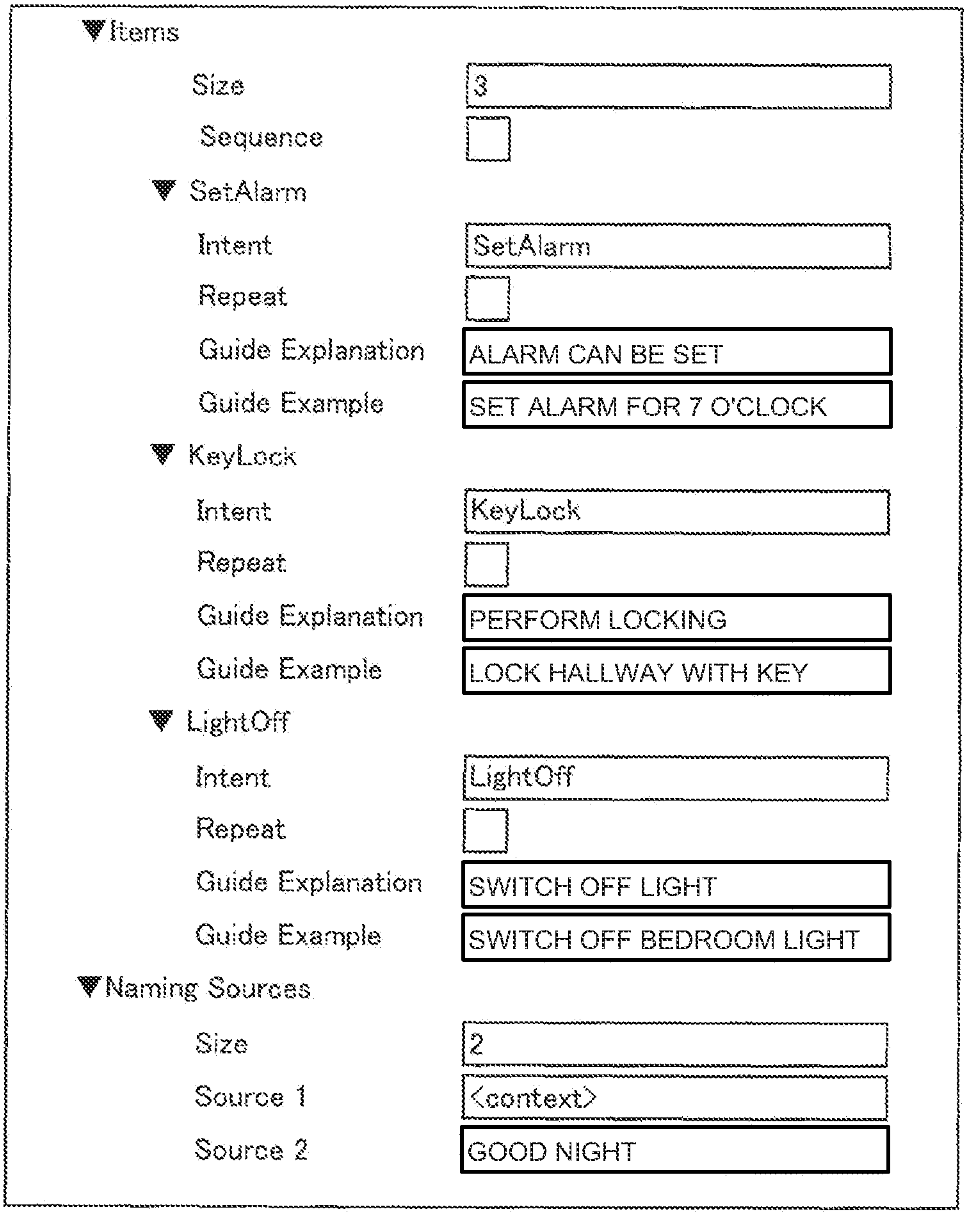

FIG.6

▼ Items
- Size: 3
- Sequence: ☐
- ▼ SetAlarm
  - Intent: SetAlarm
  - Repeat: ☐
  - Guide Explanation: ALARM CAN BE SET
  - Guide Example: SET ALARM FOR 7 O'CLOCK
- ▼ KeyLock
  - Intent: KeyLock
  - Repeat: ☐
  - Guide Explanation: PERFORM LOCKING
  - Guide Example: LOCK HALLWAY WITH KEY
- ▼ LightOff
  - Intent: LightOff
  - Repeat: ☐
  - Guide Explanation: SWITCH OFF LIGHT
  - Guide Example: SWITCH OFF BEDROOM LIGHT ▼ Naming Sources
- Size: 2
- Source 1: <context>
- Source 2: GOOD NIGHT

FIG.8

```
"Items": [
  {
    "Speech": "FRIEND LIST",
    "Intent": "ShowFriend",
    "Entities": [],
    "Context": {
      "DateTimeString": "2018-04-16T17:33:46.8090832+09:00",
      "GameName": "GameLand",
      "SceneName": "Stage4",
      "PlayerType": "Fighter"
    }
  },
  {
    "Speech": "SELECT THIRD PERSON",
    "Intent": "SelectItem",
    "Entities": [
      {
        "Type": "SelectedItem",
        "Literal": "THIRD PERSON"
      }
    ],
    "Context": {
      "DateTimeString": "2018-04-16T17:33:56.2120832+09:00",
      "GameName": "GameLand",
      "SceneName": "Stage4",
      "PlayerType": "Fighter"
    }
  },
  {
    "Speech": "INVITE",
    "Intent": "CreateInvitation",
    "Entities": [],
    "Context": {
      "DateTimeString": "2018-04-16T17:34:01.2640832+09:00",
      "GameName": "GameLand",
      "SceneName": "Stage4",
      "PlayerType": "Fighter"
    }
  },
          .
          .
          .
  {
    "Speech": "SEND",
    "Intent": "SendInvitation",
    "Entities": [],
    "Context": {
      "DateTimeString": "2018-04-16T17:34:12.5110832+09:00",
      "GameName": "GameLand",
      "SceneName": "Stage4",
      "PlayerType": "Fighter"
    }
  }
]
```

FIG.9

```
"Items": [
  {
    "Speech": "PLAY ARTIST B",
    "Intent": "MUSIC-PLAY",
    "Entities": [
      {
        "Type": "TARGET_MUSIC",
        "Literal": "ARTIST B"
      }
    ],
    "Context": {
      "DateTimeString": "2018-04-16T17:34:55.8660832+09:00",
      "UserArea": "Kitchen",
      "UserAction": "Cooking",
      "RunningApp": "ChineseRecipes"
    }
  },
  {
    "Speech": "SET VOLUME LEVEL AT 15",
    "Intent": "BASICS-VOLUME_SET",
    "Entities": [
      {
        "Type": "NUMERIC",
        "Literal": "15"
      }
    ],
    "Context": {
      "DateTimeString": "2018-04-16T17:35:01.4780832+09:00",
      "UserArea": "Kitchen",
      "UserAction": "Cooking",
      "RunningApp": "ChineseRecipes"
    }
  },
  {
    "Speech": "NEXT SONG",
    "Intent": "MUSIC-FORWARD",
    "Entities": [],
    "Context": {
      "DateTimeString": "2018-04-16T17:35:12.0540832+09:00",
      "UserArea": "Kitchen",
      "UserAction": "Cooking",
      "RunningApp": "ChineseRecipes"
    }
  },
              :
]
```

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/009538 filed on Mar. 8, 2019, which claims priority benefit of Japanese Patent Application No. JP 2018-109314 filed in the Japan Patent Office on Jun. 7, 2018. Each of the above-referenced applications is hereby incorporated herein by reference in its entirety.

FIELD

The present disclosure relates to an information processing device and an information processing method.

BACKGROUND

In recent years, devices that can be operated via utterances have become widespread. A great number of technologies for improving the convenience of users using such devices have also been proposed. For example, Patent Literature 1 discloses technology for generating a macro from a plurality of function execution instructions which are issued via utterances.

CITATION LIST

Patent Literature

Patent Literature 1: Japanese Patent Application No. 2018-5061

SUMMARY

Technical Problem

In the technique disclosed in Patent Literature 1, the names of macros for which registration is to be performed must be determined by the users themselves. However, there are also likely to be cases where it is impossible for a user to instantly determine what kind of wording should be set for a macro.

Therefore, the present disclosure proposes a new and improved information processing device and information processing method with which a more memorable macro name can be determined automatically.

Solution to Problem

According to the present disclosure, an information processing device is provided that includes: an utterance learning adaptation unit that executes clustering pertaining to a plurality of function execution instructions by a user and estimates, as a macro, a cluster that includes the plurality of function execution instructions; and a response control unit that controls presentation of information pertaining to the macro, wherein the utterance learning adaptation unit determines a name for the estimated macro on the basis of a context acquired at the time of issuing the plurality of function execution instructions included in the cluster, wherein the response control unit controls a notification of the macro name to the user, and wherein the plurality of function execution instructions include at least one function execution instruction issued via an utterance.

Moreover, according to the present disclosure, an information processing device is provided that includes: a response control unit that, based on a fact that a user has uttered a name of a macro registered on the basis of clustering pertaining to a plurality of function execution instructions issued by the user, controls the execution of a plurality of functions that correspond to the macro, wherein the plurality of function execution instructions include at least one function execution instruction issued via an utterance, and wherein the name of the macro is a name which is determined on the basis of a context acquired at the time of issuing the plurality of function execution instructions.

Moreover, according to the present disclosure, an information processing method is provided that includes: by a processor, executing clustering pertaining to a plurality of function execution instructions by a user and estimating, as a macro, a cluster that includes the plurality of function execution instructions; and controlling presentation of information pertaining to the macro, wherein the estimating further comprises: determining a name for the estimated macro on the basis of a context acquired at the time of issuing the plurality of function execution instructions included in the cluster, wherein the controlling further comprises: controlling a notification of the macro name to the user, and wherein the plurality of function execution instructions include at least one function execution instruction issued via an utterance.

Moreover, according to the present disclosure, an information processing method is provided that includes: based on a fact that a user has uttered a name of a macro registered on the basis of clustering pertaining to a plurality of function execution instructions issued by the user, by a processor, controlling the execution of a plurality of functions that correspond to the macro, wherein the plurality of function execution instructions include at least one function execution instruction issued via an utterance, and wherein the name of the macro is a name which is determined on the basis of a context acquired at the time of issuing the plurality of function execution instructions.

Advantageous Effects of Invention

According to the present disclosure as described hereinabove, it is possible to automatically determine a more memorable macro name.

Note that the foregoing advantageous effects are not necessarily limited, rather, any advantageous effects disclosed in the present specification or other advantageous effects which can be ascertained from the present specification may be included in addition to the foregoing advantageous effects or instead of the foregoing advantageous effects.

BRIEF DESCRIPTION OF DRAWINGS

FIG. 5 is a diagram illustrating an example of a functional template according to the embodiment.

FIG. 6 is a diagram illustrating an example of a functional template according to the embodiment.

FIG. 8 is a diagram illustrating an example of a function execution instruction history that has been transformed into a cluster according to the embodiment.

FIG. 9 is a diagram illustrating an example of a function execution instruction history that has been transformed into a cluster according to the embodiment.

DESCRIPTION OF EMBODIMENTS

Figure 1:
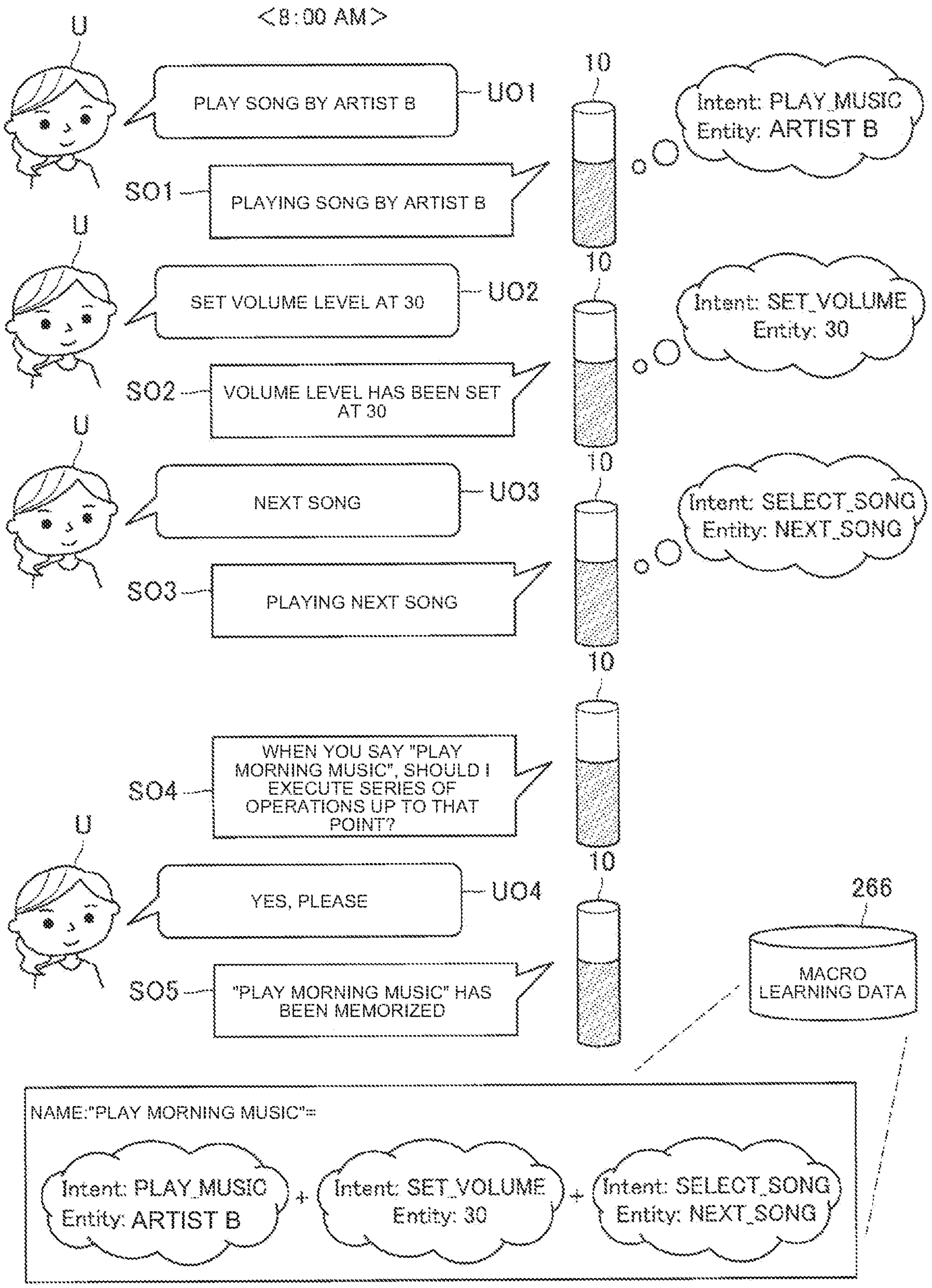
FIG. 1 is a diagram serving to provide an overview of a first embodiment of the present disclosure.

A preferred embodiment of the present disclosure will be described in detail hereinbelow with reference to the appended drawings. Note that, in the present specification and drawings, redundant descriptions of components having substantially the same functional configuration are omitted by assigning the same reference signs thereto.

Note that the description will be given in the following order.

1. Embodiment
1.1. Overview
1.2. System configuration example
1.3. Functional configuration example of information processing terminal 10
1.4. Functional configuration example of information processing server 20
1.5 Function details
2. Hardware configuration example
3. Summary

1. Embodiment

<<1.1. Overview>>

First, an overview of the first embodiment of the present disclosure will be described. As stated earlier, in recent years, devices that can be operated via utterances have become widespread. Examples of such devices include agent devices that provide various functions to a user while interacting with the user using speech.

A great number of technologies for improving the convenience of users using agent devices have also been proposed. For example, FIG. 15 of Patent Literature 1 discloses technology with which a plurality of functions can be executed due to a user registering, as macros, a plurality of function execution instructions that have been issued using speech, and subsequently using speech to designate these macros.

According to the technology disclosed in Patent Literature 1, by calling up a macro, an engine device can be made to execute a plurality of functions all at once without instructing the execution of functions one by one, thereby greatly improving user convenience.

However, in the case of the technology disclosed in Patent Literature 1, the user must explicitly issue, by making an utterance such as "remember together", function execution instructions that correspond to the macro which they want to register, as illustrated in FIG. 15. The user may also consider this kind of registration instruction to be complicated, and when the user is unaware of the macro registration function, the user is unable to enjoy the convenience of macros.

In addition, in the case of the technology disclosed in Patent Literature 1, the user must determine the name of the macro which they want to register by themselves, as illustrated in FIG. 15. However, there are also likely to be cases where it is impossible for a user to instantly determine what kind of wording should be set for a macro. Furthermore, the system may also conceivably assign a name to the macro which summarizes the plurality of functions and attributes that correspond to the macro, in which case the user may find it hard to store the macro name thus assigned or may not remember what they need to say in the situation in which they want to use the macro, and ultimately may be not be able to enjoy the convenience of the macro.

The technical idea according to the present disclosure was conceived in view of the foregoing points and makes it possible to automatically determine more memorable macro names. To this end, an information processing server 20 for implementing the information processing method according to the first embodiment of the present disclosure comprises: an utterance learning adaptation unit 250 that executes clustering pertaining to a plurality of function execution instructions by a user and estimates, as a macro, a cluster that includes the plurality of function execution instructions; and a response control unit 270 that controls the presentation of information pertaining to the macro. Furthermore, the utterance learning adaptation unit 250 according to the first embodiment of the present disclosure is characterized by determining a name for the estimated macro on the basis of a context which is acquired at the time of issuing the plurality of function execution instructions included in the cluster. In addition, the response control unit 270 according to the first embodiment of the present disclosure is characterized by controlling a notification of the macro name to the user. Here, the foregoing plurality of function execution instructions include at least one function execution instruction issued via an utterance.

FIG. 1 is a diagram to illustrate an overview of the first embodiment of the present disclosure. FIG. 1 illustrates an information processing terminal 10 constituting an agent device which is controlled by the information processing server 20 according to the present embodiment, and a user U who issues function execution instructions to the information processing terminal 10.

Referring to FIG. 1, at 8:00 a.m., user U first uses an utterance UO1 to issue a function execution instruction to the information processing terminal 10 to play a song by an artist B. At such time, the information processing server 20 performs automatic speech recognition (ASR) processing and natural-language understanding (NLU) processing based on the utterance UO1, and extracts an intent "PLAY_MUSIC" in the utterance UO1 and an entity (of interest) "artist B".

Furthermore, based on the foregoing intent and entity thus extracted, the information processing server 20 causes the information processing terminal 10 to play back the song by artist B and output a system utterance SO1.

Next, user U uses an utterance UO2 to issue a function execution instruction to set the volume level at 30. Thereupon, the information processing server 20 performs automatic speech recognition processing and natural-language understanding processing based on the utterance UO2 and extracts the intent "SET_VOLUME" and entity "30" of the utterance UO2.

The information processing server 20 also causes the information processing terminal 10 to change the volume level pertaining to music playback to 30 and output a system utterance SO2 on the basis of the foregoing extracted intent and entity.

Next, user U uses an utterance UO3 to issue a function execution instruction to play the next song. Thereupon, the information processing server 20 performs automatic speech recognition processing and natural-language understanding processing based on the utterance UO3 and extracts the intent "SELECT_SONG" and entity "NEXT_SONG" of the utterance UO3.

Furthermore, based on the foregoing intent and entity thus extracted, the information processing server 20 causes the information processing terminal 10 to play back the next song and output a system utterance SO3.

Here, the utterance learning adaptation unit 250 of the information processing server 20 according to the present embodiment executes clustering pertaining to the utterance history of user U and estimates, as a macro, a cluster that includes a plurality of function execution instructions issued using utterances UO1 to UO3. In other words, the utterance learning adaptation unit 250 according to the present embodiment is capable of automatically estimating a macro that combines three instructions, namely, an instruction to play back a song by artist B, a volume level setting instruction, and an instruction to move to the next song.

According to the foregoing functions of the utterance learning adaptation unit 250 according to the present embodiment, it is possible to automatically estimate a highly convenient macro and propose its registration to the user without the user needing to explicitly issue an instruction to register the macro.

Furthermore, at such time, the utterance learning adaptation unit 250 according to the present embodiment is characterized in that a name for the estimated macro is automatically determined. The utterance learning adaptation unit 250 according to the present embodiment may also automatically determine a name for the estimated macro on the basis of a context acquired at the time of issuing the plurality of function execution instructions included in the cluster, for example.

More specifically, the utterance learning adaptation unit 250 according to the present embodiment may also determine a name for the estimated macro on the basis of the foregoing context and the content of the plurality of function execution instructions included in the cluster. The utterance learning adaptation unit 250 according to the present embodiment is capable of determining a name that includes the gist of the context and the gist of the plurality of function execution instructions included in the cluster, for example.

In the case of the example illustrated in FIG. 1, the utterance learning adaptation unit 250 determines the name "play morning music" on the basis of "8:00 am", which has been acquired as context, and the content of the function execution instruction.

At such time, the response control unit 270 of the information processing server 20 according to the present embodiment may output, to the information processing terminal 10, a system utterance SO4 to request that the function execution instructions pertaining to utterances UO1 to UO3 be issued together when the macro name "play morning music" determined by the utterance learning adaptation unit 250 is uttered. That is, the response control unit 270 according to the present embodiment is capable of asking the user whether or not the macro estimated by the utterance learning adaptation unit 250 is to be registered under the name determined by the utterance learning adaptation unit 250.

Here, if the user U makes an utterance 004 giving their approval of the macro registration, the utterance learning adaptation unit 250 stores, as macro learning data 266, the intent and entity corresponding to the function execution instructions pertaining to utterances UO1 to UO3 in association with the name "play morning music".

Thus, with the information processing server 20 according to the present embodiment, it is possible to automatically estimate a macro that is highly convenient to the user and automatically determine a name for the macro. Furthermore, by using, in the naming, the context when the user issued a function execution instruction, the information processing server 20 according to the present embodiment is capable of determining a name that is easier for the user to commit to memory, or that is easier to remember. With the foregoing functions of the information processing server 20 according to the present embodiment, it is possible to greatly improve convenience for the user who is using the information processing terminal 10, or effectively shorten the interaction time. In addition, with the information processing server 20 according to the present embodiment, the user is able to execute a function by using context to designate same, even when the user has forgotten the detailed attribute information pertaining to execution of the function. For example, in the case of the example illustrated in FIG. 1, even when user U has forgotten the name of a song that they usually listen to in the morning, the user is able to have the forgotten song played by uttering "play morning music".

Note that, although a case where a plurality of function execution instructions according to the present embodiment are all issued using utterances is illustrated by way of example in FIG. 1, the plurality of function execution instructions according to the present embodiment may also be issued by using gestures or by pressing a button, and so forth.

<<1.2. System Configuration Example>>

Figure 2:
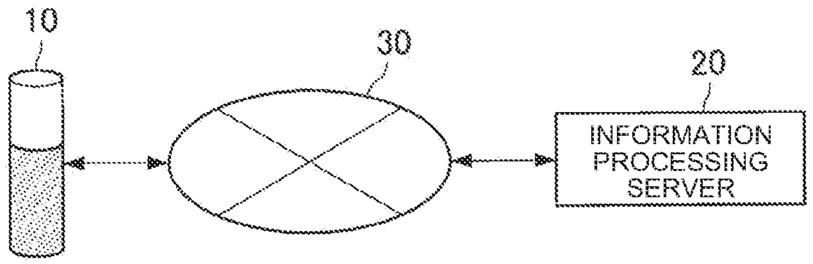
FIG. 2 is a diagram illustrating a system configuration example according to the embodiment.

Next, a system configuration example according to a first embodiment of the present disclosure will be described. FIG. 2 is a diagram illustrating a system configuration example according to the present embodiment. Referring to FIG. 2, the information processing system according to the present embodiment comprises an information processing terminal 10 and an information processing server 20. In addition, the information processing terminal 10 and the information processing server 20 are connected via a network 30 in order to be able to communicate with each other.

(Information Processing Terminal 10)

The information processing terminal 10 according to the present embodiment is an information processing device which provides various functions while interacting with the user on the basis of control by the information processing server 20. The information processing terminal 10 according to the present embodiment may, for example, be a smartphone, a tablet, a personal computer (PC), or a wearable device, or the like. In addition, the information processing terminal 10 according to the present embodiment may be a special purpose terminal of the standalone-type or the autonomous mobile type.

(Information Processing Server 20)

The information processing server 20 according to the present embodiment is an information processing device for automatically estimating macros and determining names thereof. Furthermore, the information processing server 20 according to the present embodiment has a function that, if the name of a registered macro is uttered by the user, controls the execution of a plurality of functions corresponding to the macro.

(Network 30)

The network 30 has a function for connecting the information processing terminal 10 to the information processing server 20. The network 30 may include a public line network such as the Internet, a telephone line network, or a satellite communication network; various local area networks (LAN) including Ethernet (registered trademark) networks; and a wide area network (WAN), or the like. In addition, the network 30 may include a dedicated line network such as an Internet protocol-virtual private network (IP-VPN). Furthermore, the network 30 may include a wireless communication network such as a Wi-Fi (registered trademark) network or a Bluetooth (registered trademark) network.

A configuration example of the information processing system according to the present embodiment has been described above. Note that the above-described configuration described using FIG. 2 is merely an example, and the functional configuration of the information processing system according to the present embodiment is not limited to the example. For example, the functions of the information processing terminal 10 and the information processing server 20 according to the present embodiment may be realized by a single device. The functional configuration of the information processing system according to the present embodiment can be flexibly modified according to a specification or operation.

<<1.3. Functional Configuration Example of Information Processing Terminal 10>>

Figure 3:
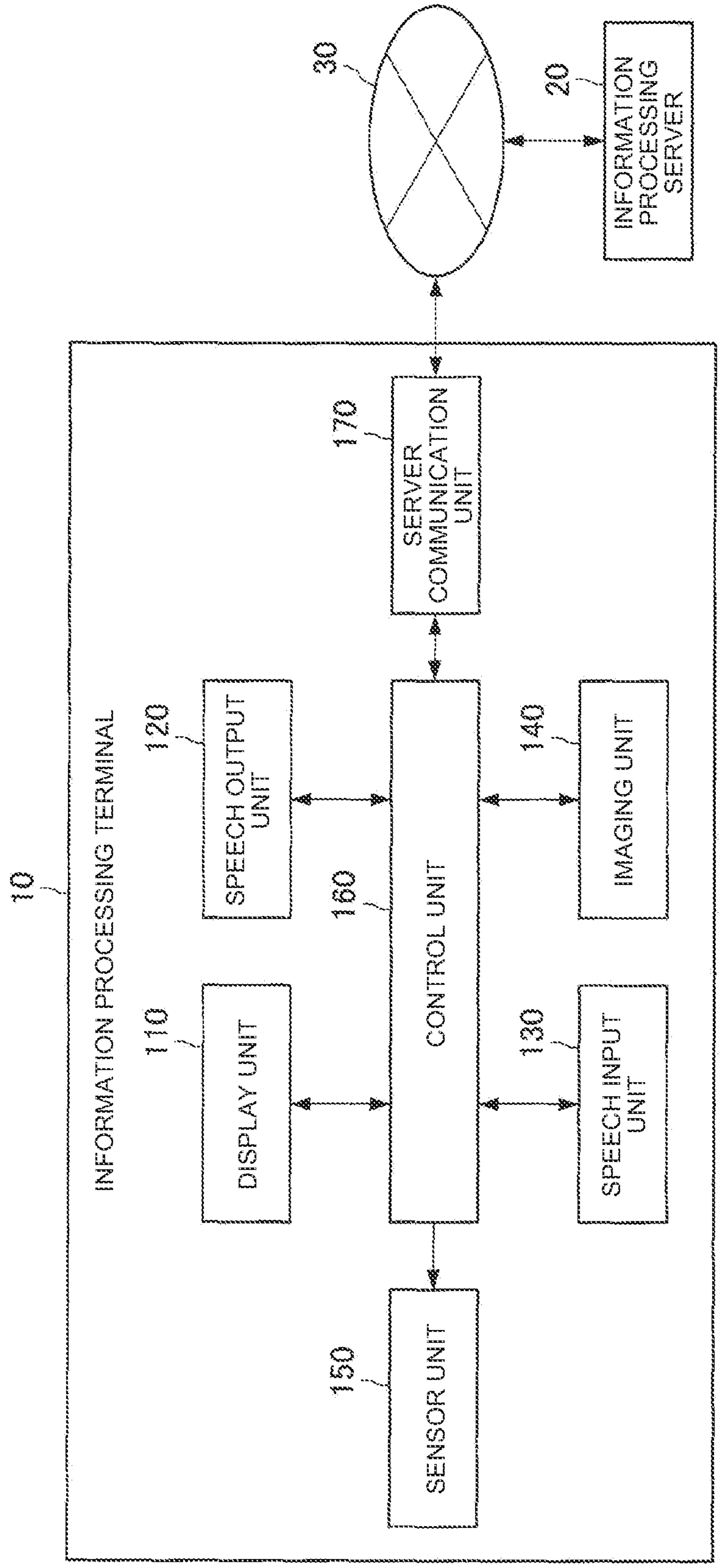
FIG. 3 is a block diagram illustrating a functional configuration example of an information processing terminal according to the embodiment.

Next, a functional configuration example of the information processing terminal 10 according to the present embodiment will be described. FIG. 3 is a block diagram illustrating the functional configuration example of the information processing terminal 10 according to the present embodiment. Referring to FIG. 3, the information processing terminal 10 according to the present embodiment comprises a display unit 110, a speech output unit 120, a speech input unit 130, an imaging unit 140, a sensor input unit 150, a control unit 160, and a server communication unit 170.

(Display Unit 110)

The display unit 110 according to the present embodiment has a function for outputting visual information such as images and text. The display unit 110 according to the present embodiment displays text and images on the basis of control by the information processing server 20, for example.

For this purpose, the display unit 110 according to the present embodiment comprises a display device that presents visual information, or the like. Examples of the display device described above include a liquid crystal display (LCD) device, an organic light emitting diode (OLED) device, and a touch panel, for example. Further, the display unit 110 according to the present embodiment may use a projection function to output visual information.

(Speech Output Unit 120)

The speech output unit 120 according to the present embodiment has a function for outputting various sounds including speech. The speech output unit 120 according to the present embodiment outputs sound on the basis of control by the information processing server 20, for example. For this purpose, the speech output unit 120 according to the present embodiment comprises a speech output device such as a loudspeaker and an amplifier.

(Speech Input Unit 130)

The speech input unit 130 according to the present embodiment has a function for collecting sound information such as user utterances and ambient sound occurring in the vicinity of the information processing terminal 10. The sound information collected by the speech input unit 130 is used in automatic speech recognition processing and context acquisition, and the like, by the information processing server 20. The speech input unit 130 according to the present embodiment comprises a microphone for collecting the sound information.

(Imaging Unit 140)

The imaging unit 140 according to the present embodiment has a function for capturing images of the user and the peripheral environment. The image information captured by the imaging unit 140 is used in user action recognition, state recognition, and peripheral environment recognition by the information processing server 20. The imaging unit 140 according to the present embodiment comprises an imaging device capable of capturing images. Note that the above images include moving images as well as still images.

(Sensor Input Unit 150)

The sensor input unit 150 according to the present embodiment has a function for collecting various sensor information relating to the peripheral environment and to user actions and states. The sensor information collected by the sensor input unit 150 is used in the recognition of the peripheral environment, user action recognition, and state recognition, by the information processing server 20. The sensor input unit 150 comprises, for example, an optical sensor including an infrared sensor; an acceleration sensor; a gyro sensor; a terrestrial magnetism sensor; a heat sensor; a vibration sensor; and a global navigation satellite system (GNSS) signal receiver, or the like.

(Control Unit 160)

The control unit 160 according to the present embodiment has a function for controlling each configuration of the information processing terminal 10. The control unit 160 controls the starting and stopping of each configuration, for example. Furthermore, the control unit 160 inputs a control signal generated by the information processing server 20, or the like, to the display unit 110 and the speech output unit 120.

(Server Communication Unit 170)

The server communication unit 170 according to the present embodiment has a function for communicating information with the information processing server 20 via the network 30. More specifically, the server communication unit 170 transmits, to the information processing server 20, sound information collected by the speech input unit 130, image information captured by the imaging unit 140, and sensor information collected by the sensor input unit 150. Furthermore, the server communication unit 170 receives, from the information processing server 20, a control signal pertaining to the response output, or the like.

The functional configuration example of the information processing terminal 10 according to the present embodiment has been described above. Note that the above configuration described with reference to FIG. 3 is merely an example, and the functional configuration of the information processing terminal 10 according to the present embodiment is not limited to or by the example. The functional configuration of the information processing terminal 10 according to the present embodiment can be flexibly modified in accordance with specifications and operations.

<<1.4. Functional Configuration Example of Information Processing Server 20>>

Figure 4:
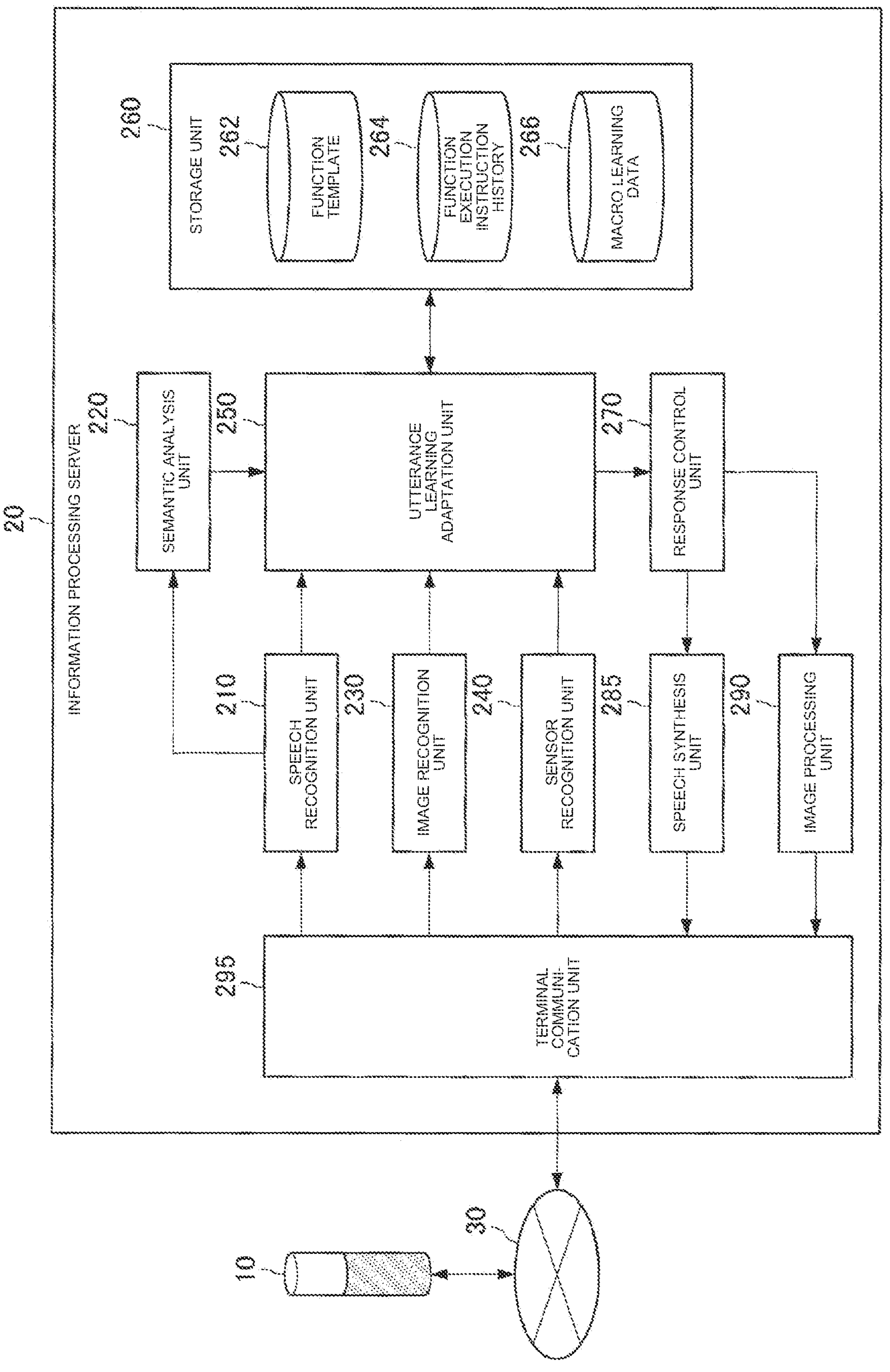
FIG. 4 is a block diagram illustrating a functional configuration example of an information processing server according to the embodiment.

Next, a functional configuration example of the information processing server 20 according to the first embodiment of the present disclosure will be described. FIG. 4 is a block diagram illustrating a functional configuration example of the information processing server 20 according to the present embodiment. Referring to FIG. 4, the information processing terminal 10 according to the present embodiment comprises a speech recognition unit 210, a semantic analysis unit 220, an image recognition unit 230, a sensor recognition unit 240, an utterance learning adaptation unit 250, a storage unit 260, a response control unit 270, a speech synthesis unit 285, an image processing unit 290, and a terminal communication unit 295.

(Speech Recognition Unit 210)

The speech recognition unit 210 according to the present embodiment performs automatic speech recognition processing on the basis of user utterances collected by the information processing terminal 10.

(Semantic Analysis Unit 220)

The semantic analysis unit 220 according to the present embodiment has a function for performing natural-language understanding processing on the results of the automatic speech recognition processing by the speech recognition unit 210 and for extracting an intent and an entity pertaining to a user utterance.

(Image Recognition Unit 230)

The image recognition unit 230 according to the present embodiment performs various recognition processing based on images captured by the information processing terminal 10. The image recognition unit 230 according to the present embodiment is capable of recognizing states of the user and peripheral environment and the like from the foregoing images, for example. The results of the recognition processing by the image recognition unit 230 are used in the context acquisition by the utterance learning adaptation unit 250.

(Sensor Recognition Unit 240)

The sensor recognition unit 240 according to the present embodiment performs various recognition processing based on sensor information collected by the information processing terminal 10. The sensor recognition unit 240 according to the present embodiment is capable of recognizing user actions and peripheral states, and the like, from the foregoing sensor information, for example. The results of the recognition processing by the sensor recognition unit 240 are used in the context acquisition by the utterance learning adaptation unit 250.

(Utterance Learning Adaptation Unit 250)

The utterance learning adaptation unit 250 according to the present embodiment causes the storage unit 260 to store a function execution instruction history 264 that associates the results of the automatic speech recognition processing by the speech recognition unit 210, the intent and entity extracted by the semantic analysis unit 220, and the acquired context. Here, the utterance learning adaptation unit 250 according to the present embodiment is capable of acquiring the foregoing context on the basis of the various recognition results by the image recognition unit 230 and sensor recognition unit 240.

Furthermore, the utterance learning adaptation unit 250 according to the present embodiment has a function for estimating, as a macro, a cluster including a plurality of function execution instructions and determining a name for the macro, on the basis of the function execution instruction history 264 and a function template 262 (described subsequently).

Moreover, based on user approval, the utterance learning adaptation unit 250 according to the present embodiment causes the storage unit 260 to store, as the macro learning data 266, a plurality of intents and entities corresponding to the estimated macro in association with the macro name thus determined. That is, based on user approval, the utterance learning adaptation unit 250 uses the determined name to register the estimated macro. Details of the functions of the utterance learning adaptation unit 250 according to the present embodiment will be separately described subsequently.

(Storage Unit 260)

The storage unit 260 according to the present embodiment stores the function template 262, the function execution Instruction History 264, and the Macro Learning Data 266, and the like.

(Response control unit 270)

The response control unit 270 according to the present embodiment has a function for controlling a response to the user on the basis of the intent and entity extracted by the semantic analysis unit 220, and the utterance learning adaptation processing by the utterance learning adaptation unit 250, and the like. The response control unit 270 pertaining to the present embodiment is capable of controlling the execution of a plurality of functions corresponding to the macro based on the fact that the name of a registered macro has been uttered by the user, for example.

The response control unit 270 according to the present embodiment may also control speech synthesis by the speech synthesis unit 285 and output synthesized speech to the information processing terminal 10, for example. Furthermore, the response control unit 270 may control the image processing unit 290 to output generated images and the like to the information processing terminal 10, for example. Additionally, the response control unit 270 may issue an instruction to execute a function to an external service via the network 30 and acquire the execution results.

(Speech Synthesis Unit 285)

The speech synthesis unit 285 according to the present embodiment has a function for performing speech synthesis on the basis of control by the response control unit 270.

(Image Processing Unit 290)

The image processing unit 290 has a function for generating images and the like on the basis of control by the response control unit 270.

(Terminal Communication Unit 295)

The terminal communication unit 295 according to the present embodiment communicates information with the information processing terminal 10 via the network 30. The terminal communication unit 295 receives, from the information processing terminal 10, sound information, images, and sensor information, and the like, pertaining to user utterances, for example. Furthermore, the terminal communication unit 295 transmits control signals generated by the response control unit 270, synthesized speech, and images, and the like to the information processing terminal 10.

A functional configuration example of the information processing server 20 according to the first embodiment of the present disclosure has been described hereinabove. Note that the above functional configuration described with reference to FIG. 4 is merely an example, and the functional configuration of the information processing server 20 according to the present embodiment is not limited to or by the example. The functional configuration of the information processing server 20 according to the present embodiment can be flexibly modified in accordance with specifications and operations.

<<1.5. Function Details>>

Next, the functions of the information processing server 20 according to the present embodiment will be described in detail. As mentioned earlier, the utterance learning adaptation unit 250 according to the present embodiment is capable of estimating, as a macro, a cluster including a plurality of function execution instructions and for presenting the macro to the user together with a name. At such time, the utterance learning adaptation unit 250 according to the present embodiment may determine a name for the macro on the basis of a preset function template 262.

FIGS. 5 and 6 are drawings indicating an example of the function template 262 according to the present embodiment. For the function template 262 pertaining to the present embodiment, the intents pertaining to the plurality of function execution instructions which are expected to be inputted continuously are defined as a template, as illustrated in FIGS. 5 and 6.

For example, FIG. 5 illustrates an example of the function template 262 in a case where an invitation feature in a game is has been transformed into a template. In the case of the example illustrated in FIG. 5, intents that pertain to the displaying of a friend list, the selection of a friend, the creation of an invitation, the inputting of invitation content, and the sending of the invitation are defined in the function template 262.

Furthermore, a setting regarding whether or not to designate the sequence of the intents may also be stored in the function template 262 according to the present embodiment. For example, in the example illustrated in FIG. 5, the sequence is designated for the foregoing intents because a checkmark has been entered in "Sequence", which is the second field from the top.

Further, guide wording for presentation to the user as an utterance guide, described subsequently, may be set for each intent in the function template 262 according to the present embodiment.

In addition, naming rules for when the utterance learning adaptation unit 250 determines the name of the macro are defined in the function template 262 according to the present embodiment. The foregoing naming rules are constituted from fixed wording representing the gist of the function template and the gist of the context at the time of utterance, for example.

In the case of the example illustrated in FIG. 5, "party invitation" is set as the fixed wording representing the gist of the function template 262. Here, when the fact that the user is playing a game with the name "Game Land" is acquired as the context, for example, the utterance learning adaptation unit 250 is capable of determining that the name of the estimated macro is "Game Land party invitation" on the basis of the foregoing naming rules.

Furthermore, in the case of the example illustrated in FIG. 6, intents pertaining to the setting of an alarm, locking execution, and the turning off of lighting equipment are defined in the function template 262. Thus, a plurality of intents with different control targets may be defined in the function template 262 according to the present embodiment. In addition, as illustrated in FIG. 6, the sequence of the intents need not be designated.

Similarly in this case, naming rules for when the utterance learning adaptation unit 250 determines the name of the macro are defined in the function template 262. In the case of the example illustrated in FIG. 6, "good night" is set as the fixed wording representing the gist of the function template 262. Here, when the fact that it is a weekday is acquired as the context, for example, the utterance learning adaptation unit 250 is capable of determining the name of the estimated macro to be "weekday good night" on the basis of the foregoing naming rules.

Note that one intent and guide wording and naming rules that correspond to the intent may be defined in the function template 262 according to the present embodiment. This kind of function template is used as an initial utterance guide, which will be described next, or the like.

The utterance guide according to the present embodiment will be described next. A situation where a user who is not accustomed to using the information processing terminal 10 is confused about how to make utterances to the information processing terminal 10, for example, is also to be expected. Furthermore, even when the information processing terminal 10 has been used, a situation where the user is unable to instantly recall the name of a registered macro is also conceivable. To this end, the response control unit 270 according to the present embodiment may support the user by displaying an utterance guide, which serves to support the function execution instructions issued via user utterances, on the information processing terminal 10.

Figure 7A:
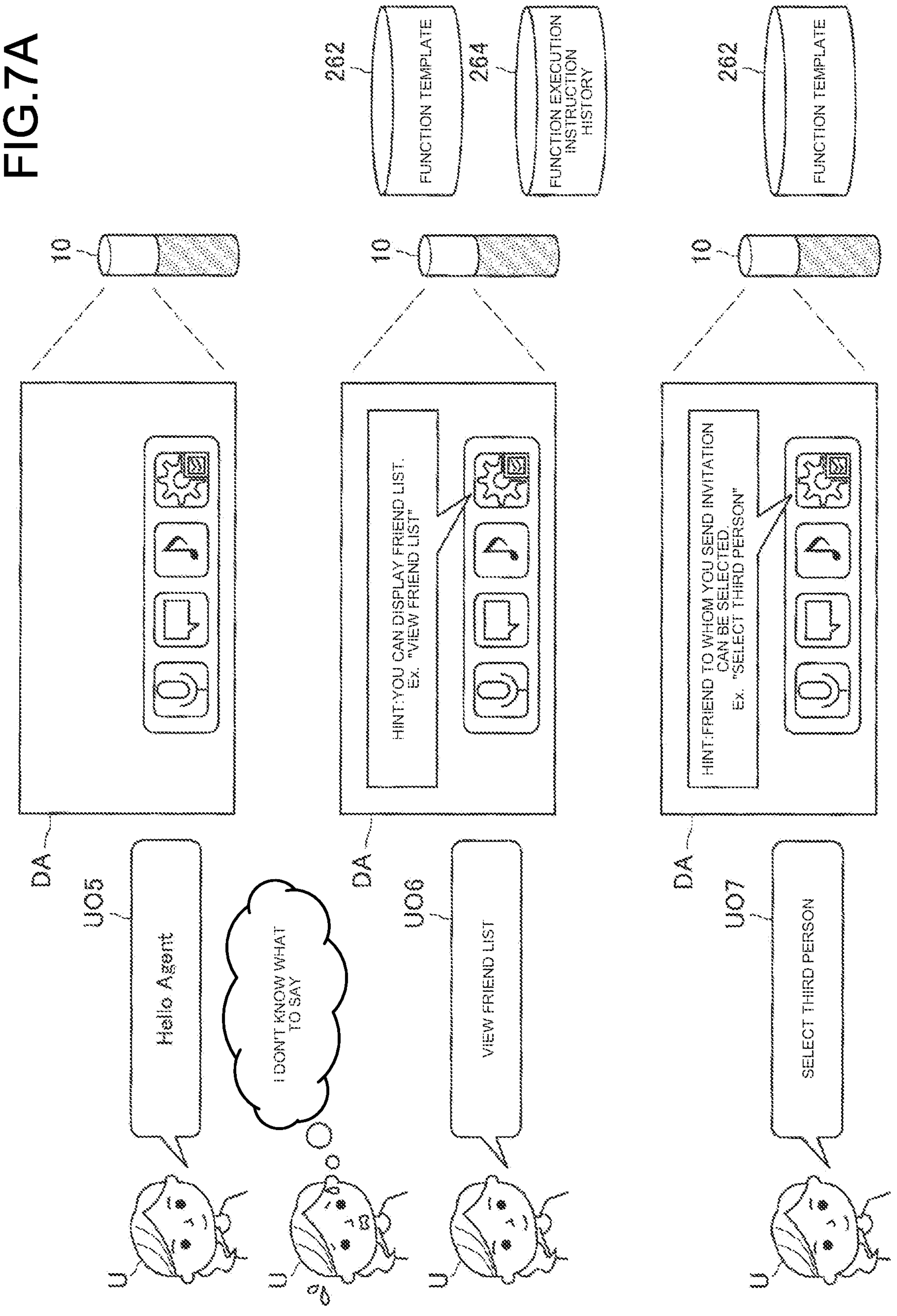
FIG. 7A is a diagram illustrating an example of an utterance guide according to the embodiment.
Figure 7B:
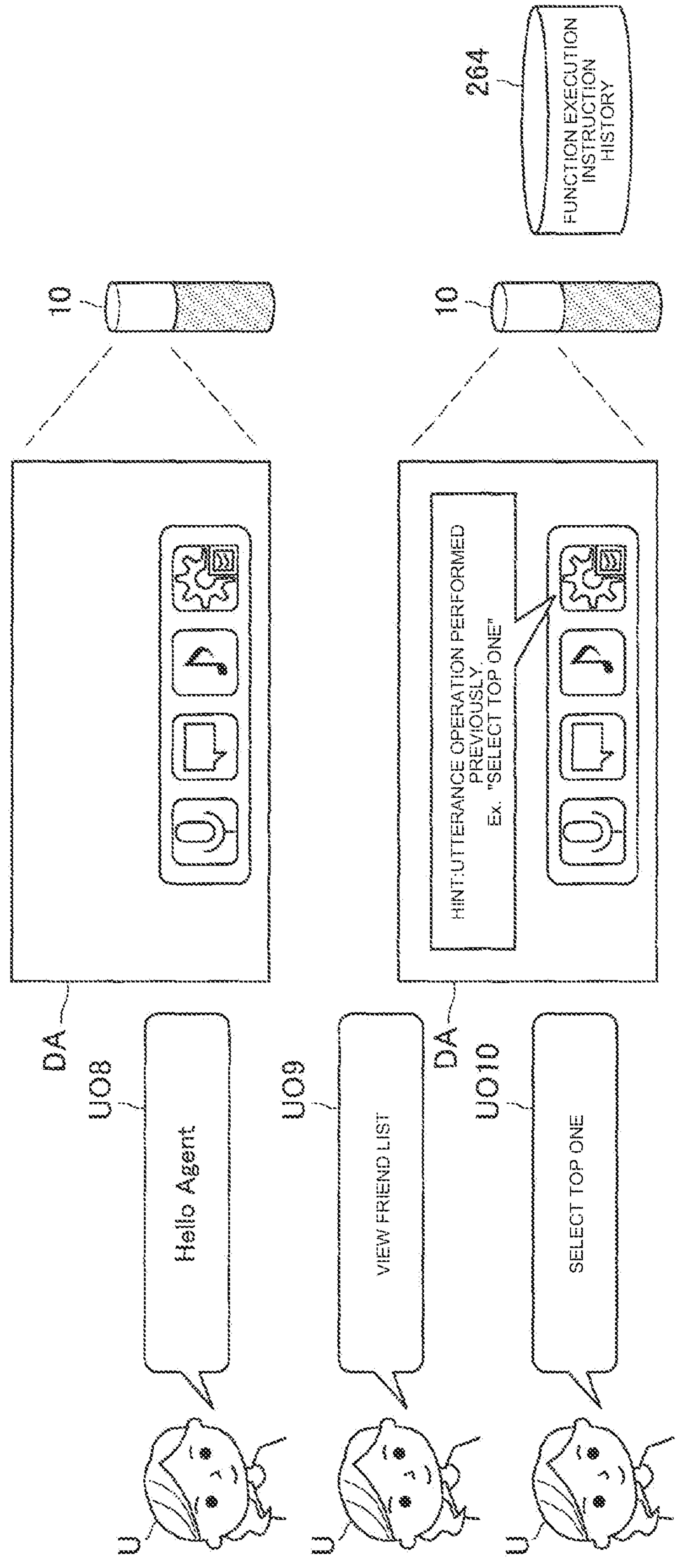
FIG. 7B is a diagram illustrating an example of an utterance guide according to the embodiment.
Figure 7C:
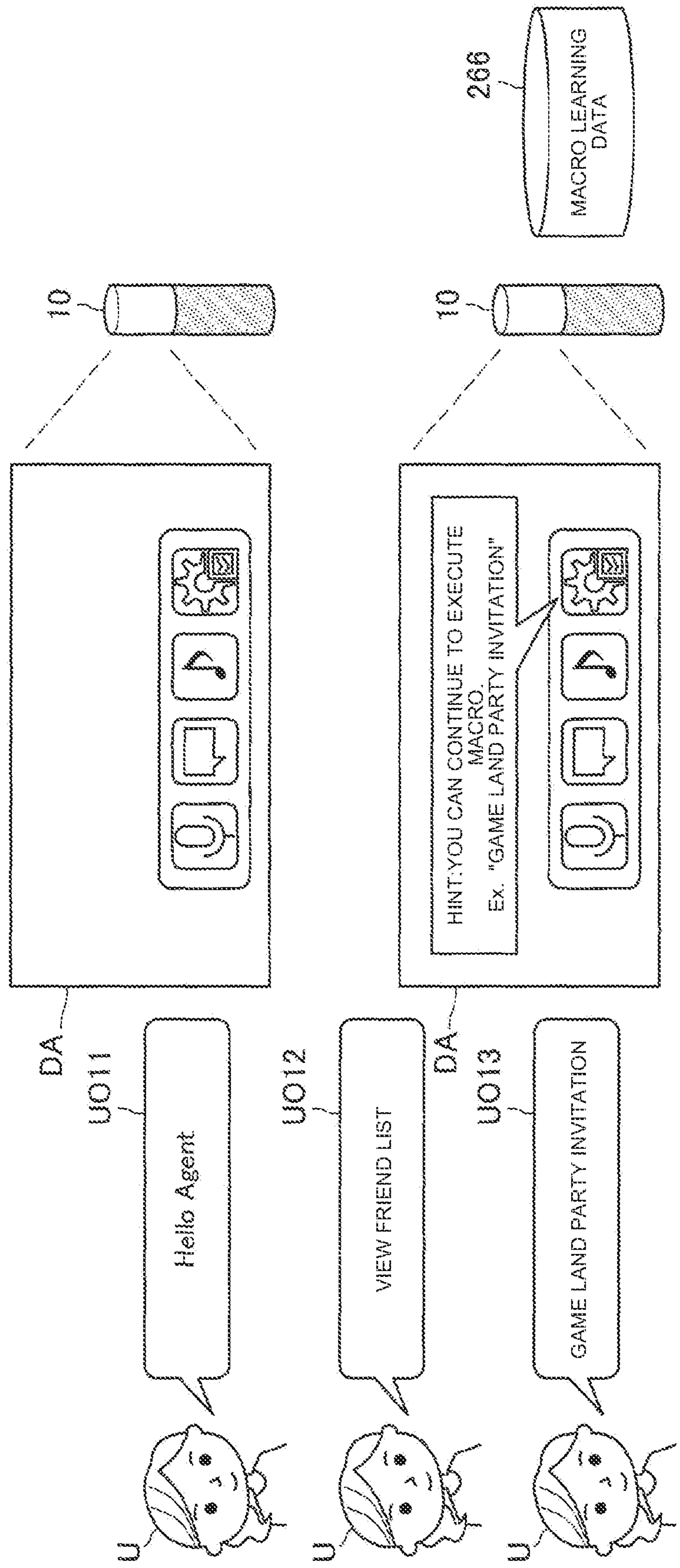
FIG. 7C is a diagram illustrating an example of an utterance guide according to the embodiment.

FIGS. 7A, 7B, and 7C are diagrams illustrating an example of an utterance guide according to the present embodiment. For example, FIG. 7A illustrates an example of an utterance guide at an initial stage in which the user has started to use the information processing terminal 10.

It is assumed that, at the foregoing initial stage, the user is not yet accustomed to the function execution instructions issued via utterances to the information processing terminal 10. Therefore, the response control unit 270 according to the present embodiment is capable of supporting the function execution instructions issued via user utterances by referring to the function execution instruction history 264 and displaying, on the information processing terminal 10, an utterance guide pertaining to functions which are used infrequently by the user.

For example, in the case of the example illustrated in FIG. 7A, user U is in a situation where they do not know how to make an utterance after first issuing an utterance UO5 that includes the activation words "Hello Agent" to activate an agent function.

At such time, the response control unit 270 according to the present embodiment refers to the function execution instruction history 264 and displays, in a display area DA of the information processing terminal 10, an utterance guide pertaining to functions which are used infrequently by user U, and, more specifically, to a function for displaying a friend list.

With the foregoing functions of the response control unit 270 according to the present embodiment, user U is able, after checking the utterance guide, to use an utterance UO6 to instruct the displaying of a friend list, and user U can be made aware of functions hitherto unknown to user U.

Note that, when, after checking the utterance guide, the user issues a function execution instruction suggested by the utterance guide, the response control unit 270 may display an utterance guide for directing user U to the function template 262, in the display area DA. In the case of the example illustrated in FIG. 7A, the response control unit 270 displays an utterance guide pertaining to a friend selection function in display area DA on the basis of the function template 262, and user U, who has checked the utterance guide, uses an utterance UO7 to issue a function execution instruction pertaining to friend selection.

Furthermore, FIG. 7B is a diagram illustrating an example of an utterance guide at the stage where storage of the history of the function execution instructions by the user has begun. At this stage, the response control unit 270 may perform control to display the utterance guide on the basis of the function execution instruction history 264 of the user.

For example, in the case of the example illustrated in FIG. 7B, the response control unit 270 refers to the function execution instruction history 264 based on the fact that user U has issued, using an utterance SO9, an instruction to execute a function pertaining to the displaying of a friend list after making an utterance UO8 including activation words, and the response control unit 270 displays, in the display area DA, an utterance guide pertaining to function execution instructions frequently issued by user U after the instruction to execute the function pertaining to the displaying of a friend list.

In the case of the example illustrated in FIG. 7B, the response control unit 270 displays, in the display area DA, an utterance guide for selecting an optional friend from the friend list thus displayed. With the foregoing function of the response control unit 270 according to the present embodiment, user U, who has checked the utterance guide displayed on the basis of past function execution instructions, is able to more easily reproduce, using an utterance UO10 or the like, a function execution instruction which is the same as a function execution instruction that they have issued in the past.

Furthermore, FIG. 7C is an example of an utterance guide at the stage where storage of registered macros has begun. At this stage, the response control unit 270 may preferentially display, in the display area DA, an utterance guide for supporting the execution of macros which have been registered by the user.

For example, in the case of the example illustrated in FIG. 7C, user U issues, using an utterance SO12, a function execution instruction pertaining to the displaying of a friend list after issuing an utterance UO11 that includes activation words. At such time, the response control unit 270 may display, in the display area DA, an utterance guide pertaining to a registered macro, based on the fact that the intention of the utterance SO12, that is, the intent extracted from the utterance SO12, matches any of a plurality of intents defined for a registered macro.

Note that, at such time, if a sequence of intents has been set in the registered macro, the response control unit 270 may display, in the display area DA, an utterance guide pertaining to the registered macro based on the fact that the intent extracted from the user utterance matches an intent that has been set in the header of the registered macro.

With the foregoing function of the response control unit 270 according to the present embodiment, user U, who has checked the utterance guide, is able to more easily instruct, using an utterance UO13 or the like, the execution of a registered macro, thereby enabling support for the active usage of the registered macro by user U.

Next, clustering of the function execution instructions according to the present embodiment will be described in detail. By clustering the function execution instruction history 264, the utterance learning adaptation unit 250 according to the present embodiment is capable of extracting a cluster that includes a plurality of highly correlated function execution instructions and of estimating this cluster as a macro.

FIGS. 8 and 9 are drawings illustrating an example of a function execution instruction history 264 that has been transformed into a cluster according to the present embodiment. As illustrated in FIGS. 8 and 9, in the present embodiment, text that has been obtained through automatic speech recognition processing (corresponds to "speech" in the drawings), intents and entities extracted through natural-language understanding processing, and acquired contexts, are stored as the function execution instruction history 264.

For example, in the case of the example illustrated in FIG. 8, text, intents, entities, and contexts that correspond to function execution instructions pertaining to the displaying of a friend list, the selection of a friend, the creation of an invitation, and the sending of the invitation, and the like, which the user has performed using utterances, are stored using the JSON (Javascript (registered trademark) Object Notation) format.

Note that, in the example illustrated in FIG. 8, the date and time when a function execution instruction is issued, the name of the game played by the user, the scene name in the game, and the type of character manipulated by the user in the game are stored as contexts.

Furthermore, in the case of the example illustrated in FIG. 9, for example, the text, intents, entities, and contexts that correspond to function execution instructions pertaining to music playback, setting of the volume level, moving to the next song, and so forth, which the user has performed using utterances, are stored using the JSON format.

Note that, in the example illustrated in FIG. 9, the date and time when a function execution instruction is issued, the location of the user, user actions, and the name of the executed application are stored as contexts.

The utterance learning adaptation unit 250 according to the present embodiment may perform the foregoing clustering on the basis of the time when the function execution instruction is issued, for example. For example, in a case where the next function execution instruction is issued within five seconds of the previous function execution instruction, the utterance learning adaptation unit 250 is capable of considering the two function execution instructions as the same cluster.

The utterance learning adaptation unit 250 according to the present embodiment may also perform clustering on the basis of context uniformity, for example. For example, in a case where a function execution instruction with the same context is issued within three minutes after the previous function execution instruction, the utterance learning adaptation unit 250 is capable of considering the two function execution instructions as the same cluster.

Furthermore, the utterance learning adaptation unit 250 according to the present embodiment may perform clustering on the basis of the strength of association of function execution instructions, for example. For example, in a case where two function execution instructions issued within three minutes are defined as the same function template 262, the utterance learning adaptation unit 250 is capable of considering the two function execution instructions as the same cluster.

As described hereinabove, with the utterance learning adaptation unit 250 according to the present embodiment, function execution instructions which have a high probability of being issued continuously can be transformed into a cluster.

Furthermore, the utterance learning adaptation unit 250 according to the present embodiment may determine whether or not to estimate the cluster thus detected as a macro on the basis of the degree of composition and detection frequency that pertain to the cluster. Here, the degree of composition may be denoted by the total number of intents and entities the cluster includes. Further, the detection frequency of the cluster may be denoted by the number of times a cluster with the same intents and entities is detected. The utterance learning adaptation unit 250 according to the present embodiment may estimate the cluster as a macro when the value of the degree of composition * the detection frequency is equal to or greater than a predetermined threshold value (15, for example), for example.

With the foregoing function of the utterance learning adaptation unit 250 according to the present embodiment, it is possible to improve user convenience by estimating, as macros, clusters for which the burden of issuing function execution instructions individually is high and clusters with a high usage frequency.

Note that the response control unit 270 may present a macro which has been estimated by the utterance learning adaptation unit 250 as detailed earlier, with timing when the attention of the user is easily obtained. The response control unit 270 is capable of performing the presentation control as illustrated in FIG. 1 with timing which the sensor recognition unit 240 has recognized as being when the user is not operating the game controller, and so forth, for example.

Figure 10:
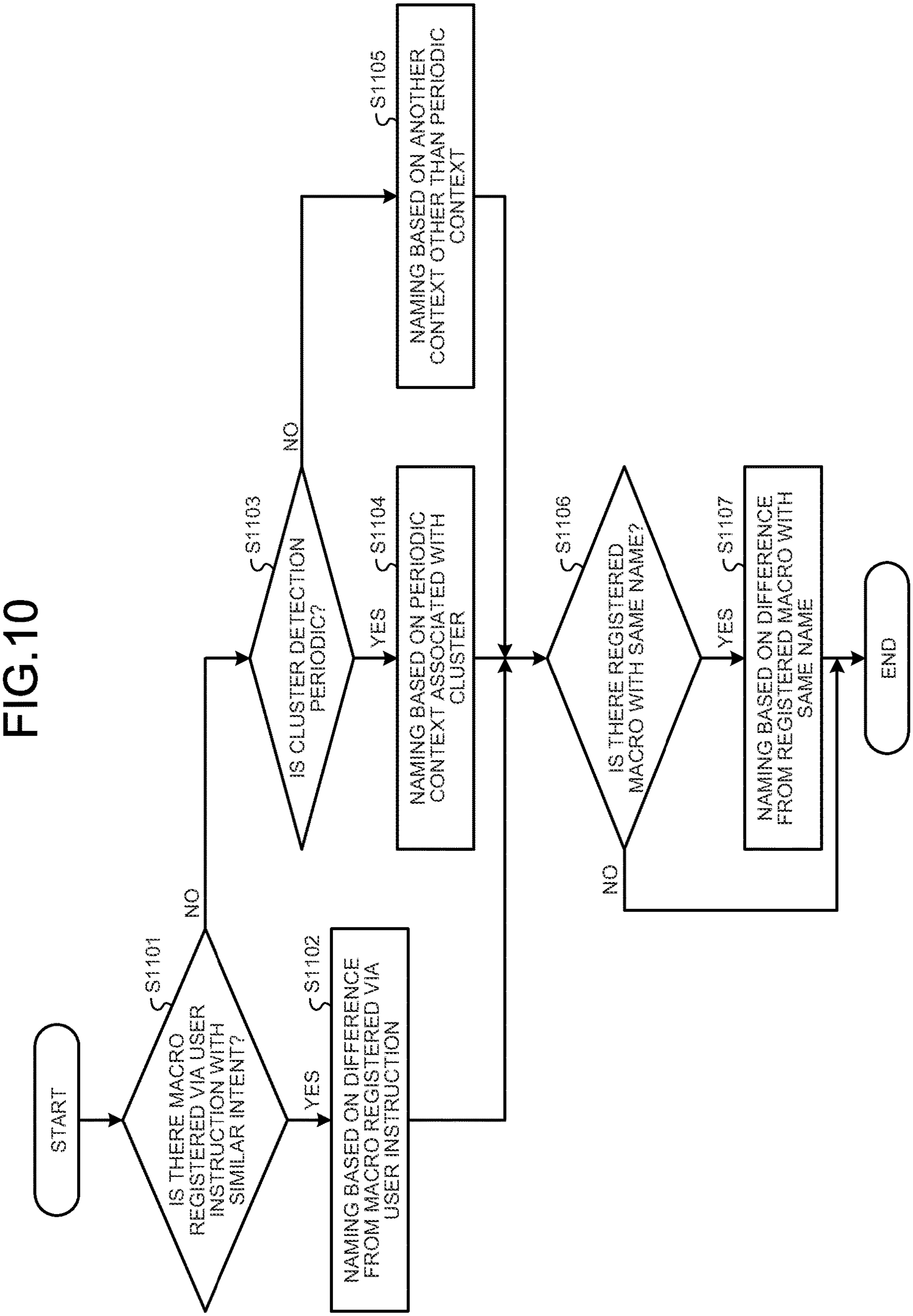
FIG. 10 is a flowchart illustrating the flow of macro naming according to the embodiment.

The flow of the macro naming according to the present embodiment will be described next. FIG. 10 is a flowchart illustrating the flow of the macro naming according to the present embodiment.

Referring to FIG. 10, the utterance learning adaptation unit 250 according to the present embodiment first determines whether a registered macro exists which has been registered via a user instruction and which includes an intent similar to an estimated macro (S1101).

Here, when a registered macro exists which has been registered via a user instruction and which includes an intent similar to an estimated macro (S1101: Yes), the utterance learning adaptation unit 250 determines a name for the estimated macro on the basis of the difference between the estimated macro and the macro registered via a user instruction (S1102).

More specifically, the utterance learning adaptation unit 250 according to the present embodiment may determine the name on the basis of the foregoing difference after inheriting the naming policy when the user voluntarily registered the macro in the past. With this function, the name of the estimated macro can be determined on the basis of naming rules which are estimated as being easy for the user to commit to memory. At such time, the utterance learning adaptation unit 250 is capable of performing naming on the basis of a context difference or the difference between a plurality of function execution instructions (intents and entities) included in a cluster.

More specifically, the utterance learning adaptation unit 250 first focuses on the differences in a periodic context representing periodicity. For example, let us assume a case where, when an estimated macro includes function execution instructions pertaining to the locking of a key associated with a periodic context "weekend" and to switching off lighting equipment, there exists a registered macro with the name "good night" that includes function execution instructions pertaining to the setting of an alarm, key locking, and switching off lighting equipment and which are associated with a periodic context "weekdays" exists. At such time, the utterance learning adaptation unit 250 according to the present embodiment may determine the name of the estimated macro to be "weekend good night" on the basis of the difference in a periodic context.

However, when there is no difference in the periodic context, the utterance learning adaptation unit 250 may perform naming of the estimated macro on the basis of another context difference. For example, in a case where the estimated macro includes a function execution instruction for switching off lighting equipment in a child's room and is associated with the context of being with the child, the utterance learning adaptation unit 250 may determine the name of the estimated macro to be "good night with child".

In addition, when there is no difference in context, the utterance learning adaptation unit 250 may also determine the name for the estimated macro on the basis of excessive or deficient intent between an estimated macro and a registered macro. For example, in a case where the registered macro includes an intent pertaining to the setting of an alarm but the estimated macro does not include this intent, the utterance learning adaptation unit 250 may determine the name of the estimated macro to be "good night without alarm".

If, on the other hand, there is no such excessive or deficient intent, the utterance learning adaptation unit 250 is also capable of naming the estimated macro on the basis of an entity difference. For example, in a case where the registered macro includes an intent pertaining to the setting of an alarm at 7 o'clock (entity) but the estimated macro includes an intent at 8 o'clock (entity), the utterance learning adaptation unit 250 may determine the name of the estimated macro to be "good night with 8 o'clock alarm".

Note that, when a registered macro which has been registered via a user instruction and which includes an intent similar to the estimated macro does not exist (S1101: No), the utterance learning adaptation unit 250 then determines whether or not the cluster detection frequency is periodic (S1103). At such time, the utterance learning adaptation unit 250 is capable of making a determination on the basis of the foregoing periodic context.

Here, when the cluster detection is periodic (S1103: Yes), that is, when the cluster is associated with a periodic context, the utterance learning adaptation unit 250 determines a name for the estimated macro on the basis of the periodic context (S1104). For example, in the case of a cluster which is often detected in a morning time zone on a daily cycle, the utterance learning adaptation unit 250 may determine a name such as "play morning music" or similar. Furthermore, in the case of a cluster which is often implemented on Wednesdays on a weekly cycle (in an inconstant time zone), the utterance learning adaptation unit 250 may determine a name such as "Wednesday party invitation" or similar. In addition, in the case of a cluster which is often implemented in an evening time zone on Wednesdays on a weekly cycle, the utterance learning adaptation unit 250 may determine a name such as "Wednesday evening party invitation" or similar.

Thus, even in a case where a plurality of contexts may be acquired, the utterance learning adaptation unit 250 according to the present embodiment is capable of first registering a macro under a name that is easier to commit to memory by performing naming on the basis of a periodic context for which a high degree of dependency is expected, or the like.

When, on the other hand, the cluster detection frequency is not periodic (S1103: No), the utterance learning adaptation unit 250 determines the name of the estimated macro on the basis of another context other than a periodic context (S1105). More specifically, when a plurality of clusters are associated with the same context, the utterance learning adaptation unit 250 is capable of determining a name for the estimated macro on the basis of the context.

For example, when a plurality of clusters area associated with a context pertaining to playing the same game, the utterance learning adaptation unit 250 may determine a name such as "play music during Game Land". In addition, when a plurality of clusters are associated with a context pertaining to the same stage of a game, for example, the utterance learning adaptation unit 250 may determine a name such as "party invitation for stage 4". Furthermore, when a plurality of clusters are associated with a context pertaining to a cooking behavior, the utterance learning adaptation unit 250 may determine a name such as "Play the music while cooking".

After a name for the estimated macro is determined in step S1102, S1104, or S1105, the utterance learning adaptation unit 250 next determines whether or not there is a registered macro with the same name as this name (S1106).

Here, when there is a registered macro with the same name (S1106: Yes), the utterance learning adaptation unit 250 performs naming of the estimated macro on the basis of the difference from the registered macro with the same name (S1107).

At such time, the utterance learning adaptation unit 250 may, as illustrated in step S1102, perform naming in order of priority, that is, according to the difference in a periodic context, the difference in another context, excessive or deficient intent, and then the difference in entity, in that order.

For example, when only an estimated macro cluster is associated with a context indicating that a meal is carrying out in a case where a registered context exists with the name "play morning music", the utterance learning adaptation unit 250 may determine the name "play breakfast music" on the basis of this difference.

Furthermore, when only an estimated macro cluster includes an entity pertaining to a friend C in a case where a registered context with the name "Stage 4 party invitation" exists, for example, the utterance learning adaptation unit 250 may determine the name "Stage 4 party invitation with Mr A added" on the basis of this difference.

The flow of macro naming according to the present embodiment has been described in detail hereinabove. With the foregoing functions of the utterance learning adaptation unit 250 according to the present embodiment, the naming of an estimated macro can be automatically performed using a name which is more easily committed to memory.

The updating of a registered macro name according to the present embodiment will be described next. As mentioned earlier, the utterance learning adaptation unit 250 according to the present embodiment is capable of determining a macro name on the basis of various contexts. However, after registering a macro, cases where, depending on circumstances, there is a high degree of dependency on context that differs from the context at the time of registration are also to be expected.

Figure 11:
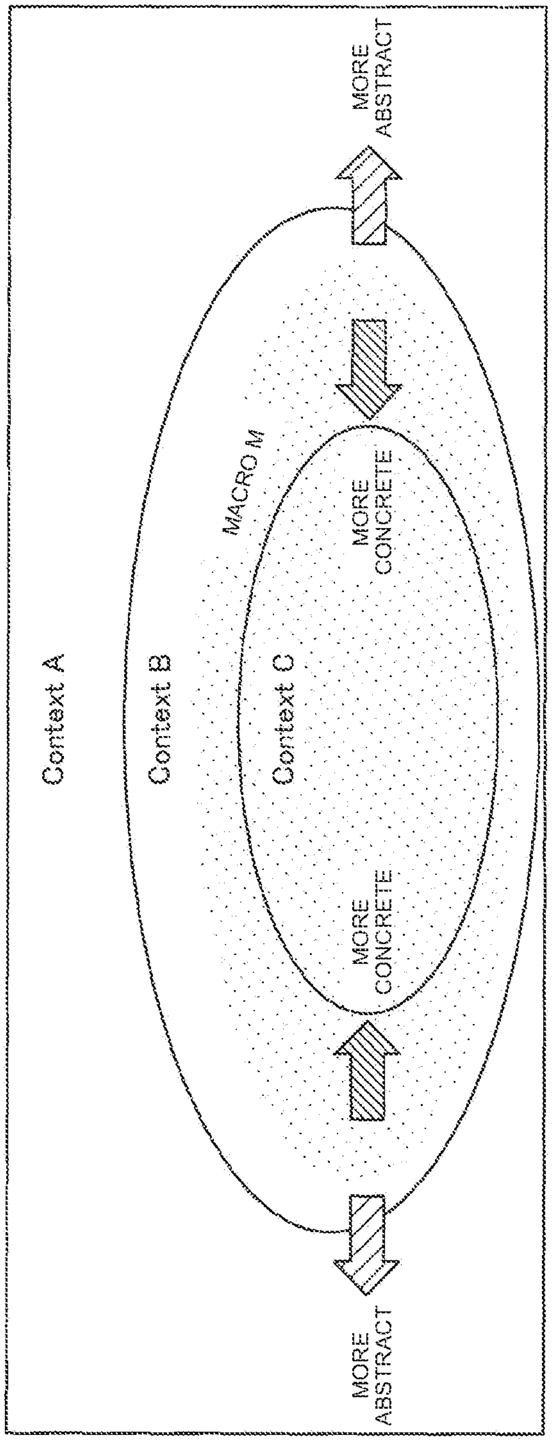
FIG. 11 is a conceptual diagram to illustrate context dependency changes according to the embodiment.

FIG. 11 is a conceptual diagram to illustrate context dependency changes according to the present embodiment. FIG. 11 illustrates an example of a case where a macro M, which has been named on the basis of a context B, exists when contexts A, B, and C are subject to an inclusion relation in that order.

At such time, as usage of the information processing terminal 10 by the user progresses and a function execution instruction history 264 is accumulated, there may be occasions when the execution of macro M has a high degree of dependency on context C. Here, the utterance learning adaptation unit 250 according to the present embodiment may update the name as a macro obtained by associating macro M with context C, based on the fact that a conditional probability P (C|M) is estimated to be equal to or greater than a predetermined threshold value ("more concrete" in the drawings).

However, when the context pertaining to the execution of macro M is expanded to context A due to the accumulation of the function execution instruction history 264, the utterance learning adaptation unit 250 according to the present embodiment may update the name by using macro M as the macro associated with context A based on the fact that a conditional probability P (B|M) is estimated to be equal to or below a predetermined threshold value ("more abstract" in the drawings).

Thus, in a case where a registered macro is estimated to have a high degree of dependency on a context different from the time of registration, the utterance learning adaptation unit 250 pertaining to the present embodiment is capable of updating the name of the registered macro on the basis of the high dependency context.

Figure 12:
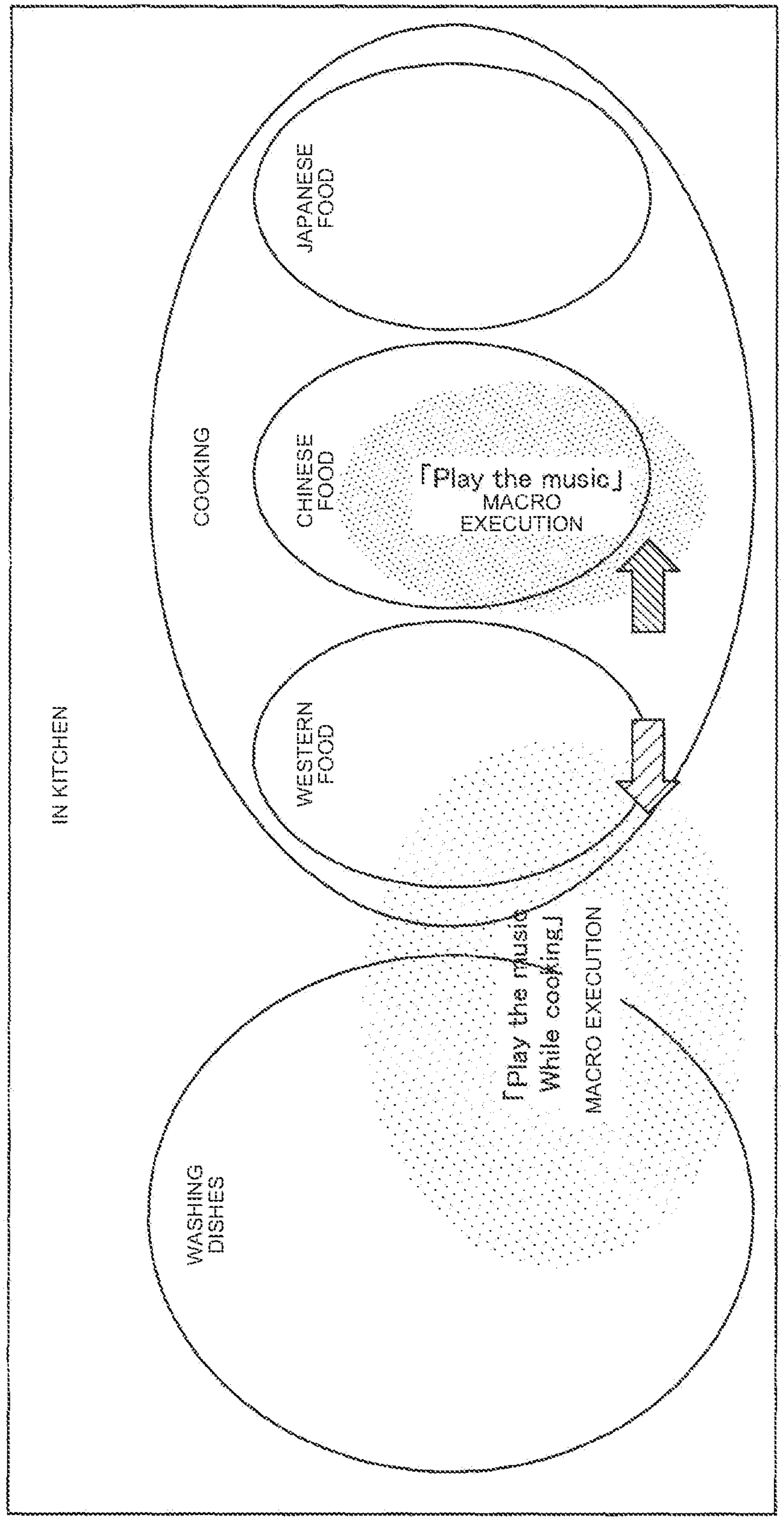
FIG. 12 is a diagram illustrating an example of the updating of a registered macro name according to the embodiment.

FIG. 12 is a diagram illustrating an example of the updating of a registered macro name according to the embodiment. In the example illustrated in FIG. 12, as a registered macro, there is a macro with the name "Play the music while cooking", which is associated with a context indicating that cooking is carrying out.

At such time, as usage of the information processing terminal 10 by the user progresses and the function execution instruction history 264 is accumulated, there may be occasions when an increase in cases where the user is executing the foregoing macro while listening to (or viewing) a Chinese recipe. At such time, the utterance learning adaptation unit 250 according to the present embodiment may update the registered macro with the name "Play the music while chinese cooking" on the basis of the context pertaining to Chinese cooking.

With the foregoing updating of the name, the circumstance at the time of usage involves a more concrete name which the user is able to easily commit to memory, and subsequently an advantageous effect is to be expected whereby another macro which is associated with another concrete context such as a context indicating that Western or Japanese food is being cooked may be easily estimated and presented to the user.

On the other hand, when there is an increase in cases where the user executes a macro while washing dishes, a context indicating that the user is in the kitchen may be newly detected which incorporates a context indicating that they are washing dishes in addition to a context indicating that cooking is carrying out. At such time, the utterance learning adaptation unit 250 may update the registered macro with the name "Play music in the kitchen".

With the foregoing naming, a macro which, until now, has been associated only with a context indicating that cooking is carrying out can be executed more broadly when the user is in the kitchen.

Name updating according to the present embodiment has been described hereinabove. Note that the main example described hereinabove was of a case in which the utterance learning adaptation unit 250 according to the present embodiment performs macro naming and name updating on the basis of an acquired context and in which the response control unit 270 controls macro execution based on the fact that names are uttered.

On the other hand, when the context which is used to determine the name of the macro matches the context which is acquired at the point the user makes an utterance for instruction to execute the macro, the response control unit 270 according to the present embodiment may control the corresponding macro execution even when the user does not utter the context wording contained in the macro name.

For example, in the example illustrated in FIG. 12, when the user, who is in the kitchen, says "Play music", the response control unit 270 may control the execution of the macro with the name "Play music in the kitchen" based on the fact that the image recognition unit 230 and the sensor recognition unit 240 have recognized that the user is in the kitchen.

The response control unit 270 may also perform the foregoing control on the basis of a context that is expected in the near future. For example, when the image recognition unit 230 recognizes that the user is taking a cooking utensil such as a frying pan from a shelf, it is predicted that the user will be cooking a few seconds or a few minutes later. Thereupon, the response control unit 270 may control the execution of the macro with the name "Play the music while cooking" even when the user has said "Play music".

Thus, with the response control unit 270 according to the present embodiment, it is possible to complement context wording that is contained in a macro name on the basis of the context acquired at the time the user makes an utterance for instruction to execute the macro.

Figure 13A:
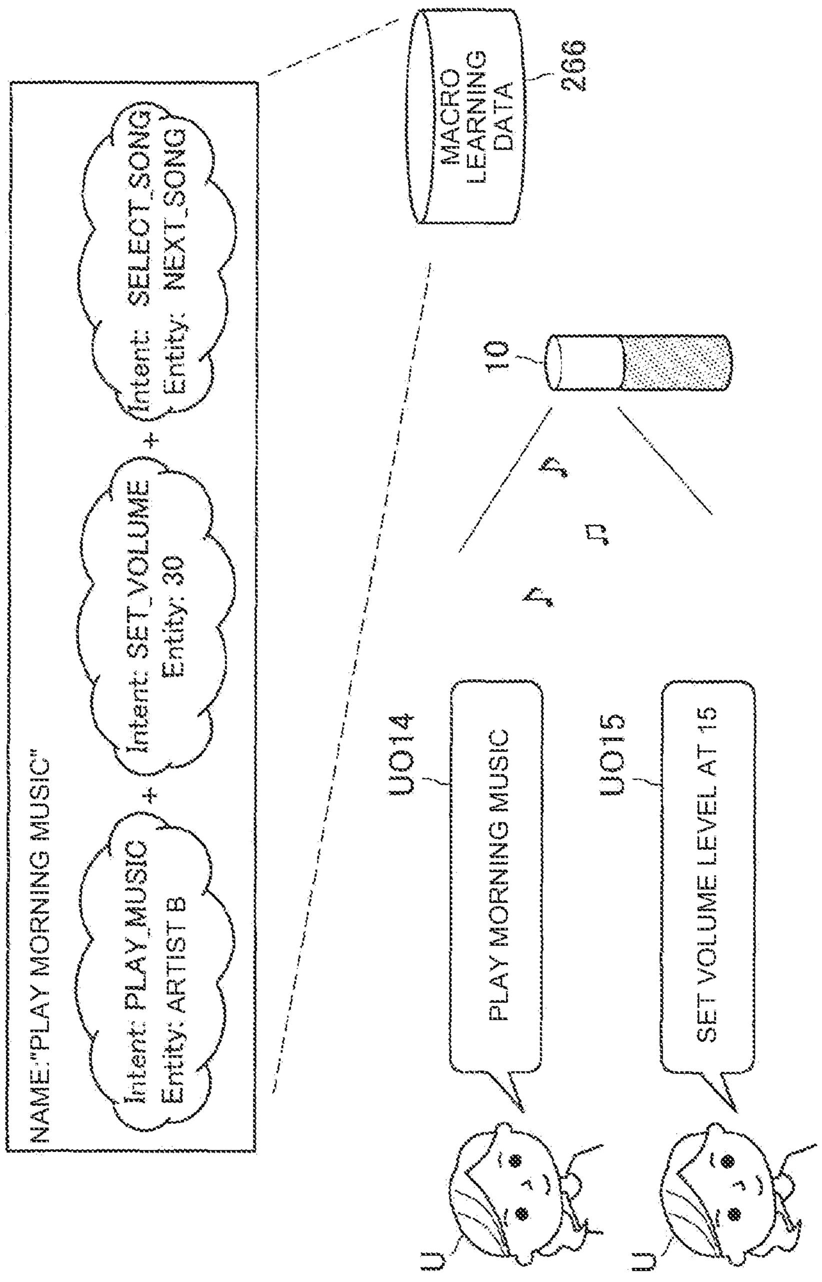
FIG. 13A is a diagram serving to illustrate an example of user feedback-based control according to the embodiment.
Figure 13B:
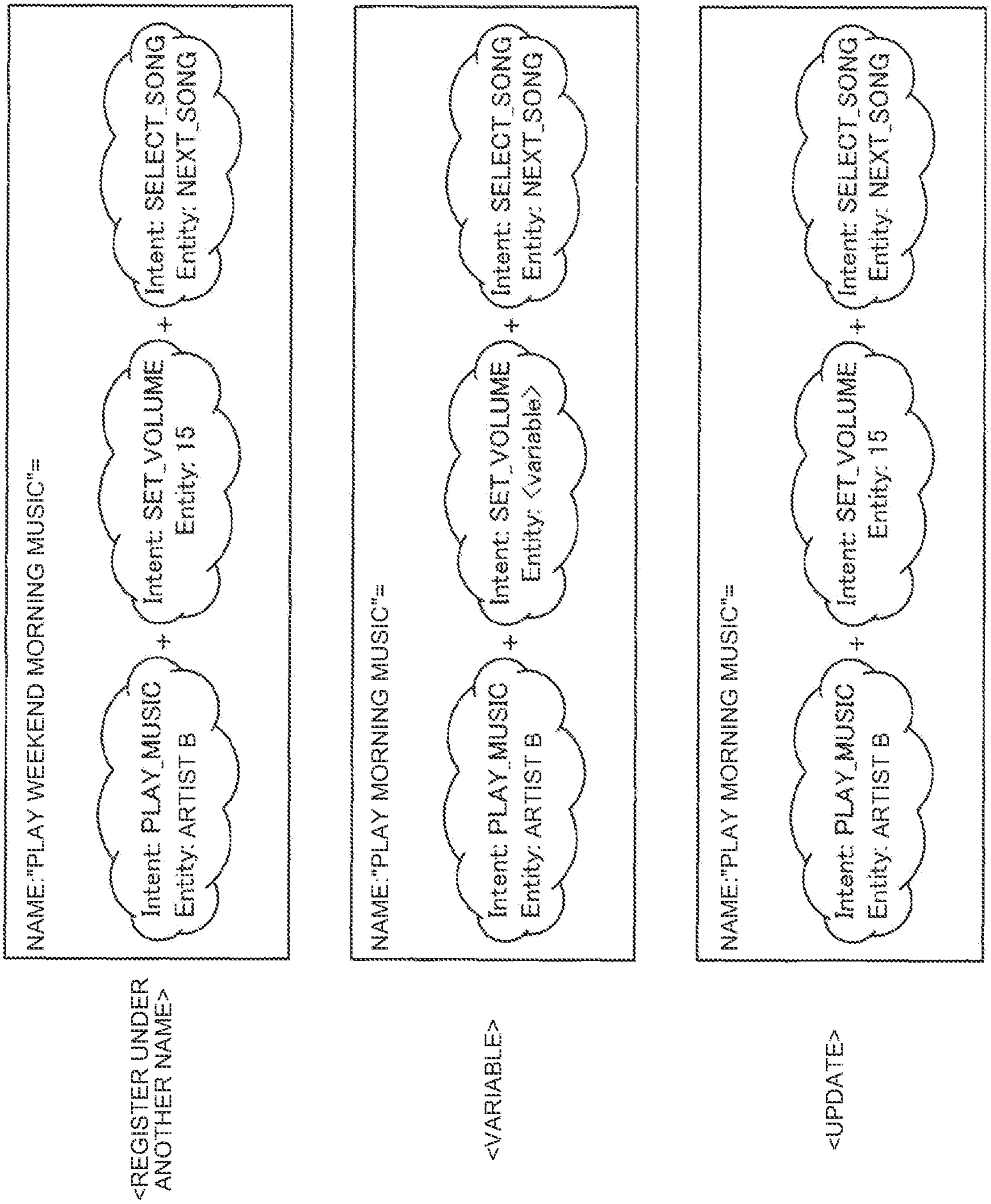
FIG. 13B is a diagram serving to illustrate an example of user feedback-based control according to the embodiment.

Next, control based on user feedback will be described. FIGS. 13A and 13B are diagrams serving to illustrate examples of user feedback-based control according to the present embodiment.

For example, FIG. 13A illustrates an example of a case where, when a macro which includes function execution instructions pertaining to the playback of a song by an artist B, setting of a volume level 30, and moving to the next song exists under the name "play morning music", a change to a volume level 15 is instructed via an utterance UO15 after user U gives an instruction to execute the macro via an utterance UO14.

At such time, the utterance learning adaptation unit 250 according to the present embodiment may recognize the utterance UO15 as feedback from the user to a function that has been executed on the basis of the macro, and perform control based on this feedback. For example, as illustrated in FIG. 13A, when the user gives an instruction to revise the execution content of a volume level setting function that has been executed on the basis of the macro, the utterance learning adaptation unit 250 performs control on the basis of this revision instruction.

At such time, the utterance learning adaptation unit 250 may reflect the revision instruction and estimate, under another name, a new macro which includes an entity "15" pertaining to the intent "SET_VOLUME", as illustrated in the top part of FIG. 13B, for example.

The utterance learning adaptation unit 250 may also revise a registered macro on the basis of feedback like that above. For example, when the user gives an instruction to revise the execution content of a function that has been executed on the basis of the macro, the utterance learning adaptation unit 250 may make the execution content (entity) pertaining to the function (intent) to be revised variable in the registered macro, as illustrated in the middle of FIG. 13B.

In this case, the user is able to instruct the content of the newly variable entity by saying "play morning music at volume level 15" or "play morning music at volume level 30", for example.

On the other hand, the utterance learning adaptation unit 250 may also directly update the entity in a registered macro as illustrated at the bottom of in FIG. 13B.

Thus, with the utterance learning adaptation unit 250 according to the present embodiment, estimation of a new macro or the updating of a registered macro can be performed on the basis of user feedback, thereby making it possible to provide macros that are more relevant to the current needs of user.

The functions of the information processing server 20 according to the present embodiment have been described in detail hereinabove. Note that the information processing server 20 according to the present embodiment is capable of performing various control to improve user convenience in addition to the control described above.

For example, the response control unit 270 according to the present embodiment may present a plurality of macros to the user via the information processing terminal 10 and may induce the user to select an optional macro. This function is effective for both the presentation of estimated macros and the presentation of an utterance guide.

Furthermore, for example, in presenting estimated macros, the response control unit 270 according to the present embodiment may explicitly indicate a range for the execution content of these macros. With this function, the user is able to clearly ascertain execution content that corresponds to a new macro.

Further, for example, the utterance learning adaptation unit 250 according to the present embodiment may deliberately register a plurality of macros under the same name. In this case, the response control unit 270 may, when macro execution has been instructed, ask the user via the information processing terminal 10 which macro is to be executed.

The functions of the information processing server 20 according to the present embodiment may be flexibly changed and expanded.

2. Hardware Configuration Example

Figure 14:
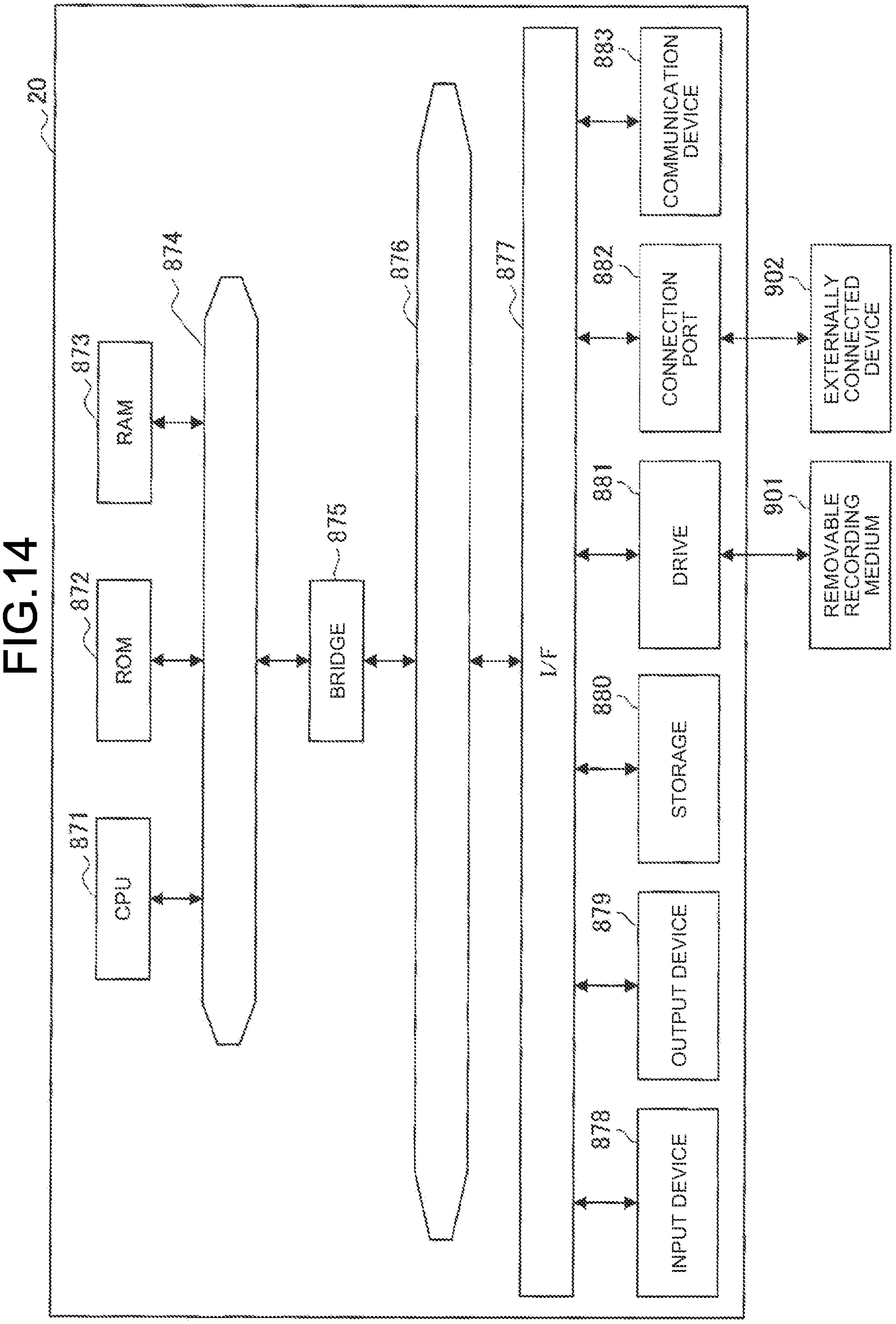
FIG. 14 is a diagram illustrating a hardware configuration example of an information processing server according to the first embodiment of the present disclosure.

Next, a hardware configuration example of the information processing server 20 according to the first embodiment of the present disclosure will be described. FIG. 14 is a block diagram illustrating a hardware configuration example of the information processing server 20 according to the first embodiment of the present disclosure. Referring to FIG. 14, the information processing server 20 comprises, for example, a CPU 871, a ROM 872, a RAM 873, a host bus 874, a bridge 875, an external bus 876, an interface 877, an input device 878, an output device 879, storage 880, a drive 881, a connection port 882, and a communication device 883. Note that the hardware configuration illustrated here is an example, and some of the components may be omitted. In addition, components other than the components illustrated herein may be further included.

(CPU 871)

The CPU 871 functions as, for example, an arithmetic processing device or a control device, and controls overall operations of the respective components or some thereof based on various programs recorded in the ROM 872, the RAM 873, the storage 880, or a removable recording medium 901.

(ROM 872, RAM 873)

The ROM 872 is a means for storing a program to be read by the CPU 871, data to be used for calculation, and the like. The RAM 873 temporarily or permanently stores, for example, the program to be read by the CPU 871, various parameters that change as appropriate when the program is executed, and the like.

(Host Bus 874, Bridge 875, External Bus 876, and Interface 877)

The CPU 871, the ROM 872, and the RAM 873 are connected to each other via, for example, the host bus 874 capable of high-speed data transmission. Meanwhile, the host bus 874 is connected to the external bus 876, which has a relatively low data transmission speed, via the bridge 875, for example. In addition, the external bus 876 is connected to various components via the interface 877.

(Input Device 878)

As the input device 878, for example, a mouse, a keyboard, a touch panel, a button, a switch, or a lever, or the like, are used. Further, a remote controller (hereinafter, remote control) capable of transmitting a control signal using infrared rays or other radio waves may be also used as the input device 878. In addition, the input device 878 also includes a speech input device such as a microphone.

(Output Device 879)

The output device 879 is a device that is capable of visually or audibly notifying a user of acquired information such as, for example, a cathode ray tube (CRT), an LCD, or an organic EL display device, an audio output device such as a loudspeaker or headphones, or a printer, a mobile phone, or a facsimile machine. In addition, the output device 879 according to the present disclosure includes various vibration devices capable of outputting haptic stimulation.

(Storage 880)

The storage 880 is a device for storing various types of data. As the storage 880, for example, a magnetic storage device such as a hard disk drive (HDD), a semiconductor storage device, an optical storage device, a magneto-optical storage device, or the like, is used.

(Drive 881)

The drive 881 is a device that reads information recorded on the removable recording medium 901 such as, for example, a magnetic disk, an optical disk, a magneto-optical disk, or a semiconductor memory, or writes information to the removable recording medium 901.

(Removable Recording Medium 901)

The removable recording medium 901 is, for example, DVD media, Blu-ray (registered trademark) media, HD DVD media, various semiconductor storage media, or the like. Naturally, the removable recording medium 901 may also be, for example, an IC card equipped with a non-contact IC chip, or an electronic device, or the like.

(Connection Port 882)

The connection port 882 is a port for connecting an externally connected device 902 such as, for example, a universal serial bus (USB) port, an IEEE 1394 port, a small computer system interface (SCSI), an RS-232C port, or an optical audio terminal, or the like.

(Externally Connected Device 902)

The externally connected device 902 is, for example, a printer, a portable music player, a digital camera, a digital video camera, or an IC recorder, or the like.

(Communication Device 883)

The communication device 883 is a communication device for connecting to a network and is, for example, a communication card for wired or wireless LAN, Bluetooth (registered trademark) or WUSB (wireless USB), or a router for optical communication, a router for ADSL (Asymmetric Digital Subscriber Line), or a modem for various communications, or the like.

3. Summary

As described hereinabove, the information processing server 20 for implementing the information processing method according to the first embodiment of the present disclosure comprises: an utterance learning adaptation unit 250 that executes clustering pertaining to a plurality of function execution instructions by a user and estimates, as a macro, a cluster that includes the plurality of function execution instructions; and a response control unit 270 that controls the presentation of information pertaining to the macro. Furthermore, the utterance learning adaptation unit 250 according to the first embodiment of the present disclosure is characterized by determining a name for the estimated macro on the basis of a context which is acquired at the time of issuing the plurality of function execution instructions included in the cluster. In addition, the response control unit 270 according to the first embodiment of the present disclosure is characterized by controlling a notification of the macro name to the user. Here, the foregoing plurality of function execution instructions include at least one function execution instruction issued via an utterance. Due to this configuration, it is possible to automatically determine a more memorable macro name.

Although a preferred embodiment of the present disclosure has been described in detail hereinabove with reference to the accompanying drawings, the technical scope of the present disclosure is not limited to or by such an example. It will be apparent to a person having ordinary knowledge in the technical field of the present disclosure that various changes or alterations are conceivable within the scope of the technical ideas described in the claims and that such modifications and alterations are naturally understood to fall within the technical scope of the present disclosure.

Furthermore, the effects described in the present specification are merely illustrative or exemplary and are not restrictive. That is, the technology according to the present disclosure can afford other advantageous effects that would be apparent to a person skilled in the art from the description of the present specification in addition to or instead of the foregoing advantageous effects.

Furthermore, a program that enables hardware such as a CPU, a ROM, and a RAM, which are built into a computer, to afford the same functions as the configurations of the information processing server 20 may also be created, and a computer-readable recording medium whereon the program is recorded may also be provided.

Moreover, the steps pertaining to the processing by the information processing server 20 of the present specification need not necessarily be processed in chronological order as per the order described in the flowchart. For example, the steps pertaining to the processing by the information processing server 20 may be processed in a different order from the order described in the flowchart or may be processed in parallel.

Note that the following configurations also belong to the technical scope of the present disclosure.

(1)

An information processing device, comprising:

an utterance learning adaptation unit that executes clustering pertaining to a plurality of function execution instructions by a user and estimates, as a macro, a cluster that includes the plurality of function execution instructions; and a response control unit that controls presentation of information pertaining to the macro, wherein the utterance learning adaptation unit determines a name for the estimated macro on the basis of a context acquired at the time of issuing the plurality of function execution instructions included in the cluster, wherein the response control unit controls a notification of the macro name to the user, and wherein the plurality of function execution instructions include at least one function execution instruction issued via an utterance.

(2)

The information processing device according to (1), wherein the utterance learning adaptation unit determines a name for the macro on the basis of the context and content of the plurality of function execution instructions included in the cluster.

(3)

The information processing device according to (2), wherein the utterance learning adaptation unit determines a name that includes the gist of the context and the gist of the plurality of function execution instructions included in the cluster.

(4)

The information processing device according to any one of (1) to (3), wherein the utterance learning adaptation unit determines a name for the macro on the basis of a high dependency context among the plurality of acquired contexts.

(5)

The information processing device according to any one of (1) to (4), wherein, when a registered macro which is similar to the estimated macro exists, the utterance learning adaptation unit determines a name for the estimated macro on the basis of a difference between the estimated macro and the registered macro.

(6)

The information processing device according to (5), wherein the utterance learning adaptation unit determines a name for the estimated macro on the basis of a difference in the context between the estimated macro and the registered macro or a difference in the plurality of function execution instructions included in the cluster.

(7)

The information processing device according to (6), wherein the utterance learning adaptation unit determines a name for the estimated macro on the basis of a difference in a periodic context between the estimated macro and the registered macro.

(8)

The information processing device according to (6) or (7), wherein the utterance learning adaptation unit determines a name for the estimated macro on the basis of excessive or deficient function execution instructions between the estimated macro and the registered macro.

(9)

The information processing device according to any one of (1) to (8), wherein, in a case where a registered macro is estimated to have a high degree of dependency on a context different from the time of registration, the utterance learning adaptation unit updates the name of the registered macro on the basis of the high dependency context.

(10)

The information processing device according to any one of (1) to (9), wherein the utterance learning adaptation unit revises the registered macro on the basis of feedback from the user to a function that has been executed on the basis of the registered macro.

(11)

The information processing device according to (10), wherein, when the user gives an instruction to revise the execution content of the function that has been executed on the basis of the registered macro, the utterance learning adaptation unit makes the execution content pertaining to the function variable in the registered macro.

(12)

The information processing device according to (10), wherein, when the user gives an instruction to revise the execution content of the function that has been executed on the basis of the registered macro, the utterance learning adaptation unit updates the execution content pertaining to the function in the registered macro.

(13)

The information processing device according to any one of (1) to (12), wherein, on the basis of feedback from the user to a function that has been executed on the basis of the registered macro, a new macro that reflects the feedback is estimated.

(14)

The information processing device according to any one of (1) to (13), wherein the utterance learning adaptation unit estimates the cluster as the macro on the basis of a degree of composition of the cluster or a detection frequency of the cluster.

(15)

An information processing device, comprising:

a response control unit that, based on a fact that a user has uttered a name of a macro registered on the basis of clustering pertaining to a plurality of function execution instructions issued by the user, controls the execution of a plurality of functions that correspond to the macro, wherein the plurality of function execution instructions include at least one function execution instruction issued via an utterance, and wherein the name of the macro is a name which is determined on the basis of a context acquired at the time of issuing the plurality of function execution instructions.

(16)

The information processing device according to (15), wherein, when the context which is used to determine the name of the macro matches the context which is acquired at a point the user makes an utterance for instruction to execute the macro, the response control unit causes a plurality of functions corresponding to the macro to be executed even when the user has made an utterance omitting a context wording contained in the macro name.

(17)

The information processing device according to (15) or (16), wherein the response control unit controls a display pertaining to an utterance guide that supports execution of the registered macro by the user.

(18)

The information processing device according to (17), wherein the response control unit displays the utterance guide when an intention of an utterance by the user matches any of a plurality of intentions defined for the registered macro.

(19)

An information processing method, comprising: by a processor, executing clustering pertaining to a plurality of function execution instructions by a user and estimating, as a macro, a cluster that includes the plurality of function execution instructions; and controlling presentation of information pertaining to the macro, wherein the estimating further comprises: determining a name for the estimated macro on the basis of a context acquired at the time of issuing the plurality of function execution instructions included in the cluster, wherein the controlling further comprises: controlling a notification of the macro name to the user, and wherein the plurality of function execution instructions include at least one function execution instruction issued via an utterance.

(20)

An information processing method, comprising:

based on a fact that a user has uttered a name of a macro registered on the basis of clustering pertaining to a plurality of function execution instructions issued by the user, by a processor, controlling the execution of a plurality of functions that correspond to the macro, wherein the plurality of function execution instructions include at least one function execution instruction issued via an utterance, and wherein the name of the macro is a name which is determined on the basis of a context acquired at the time of issuing the plurality of function execution instructions.

REFERENCE SIGNS LIST

10 Information processing terminal
20 Information processing server
210 Speech recognition unit
220 Semantic analysis unit
230 Image recognition unit
240 Sensor recognition unit
250 Utterance learning adaptation unit
260 Storage unit
262 Function template
264 Function execution instruction history
266 Macro learning data
270 Response control unit

The invention claimed is:

1. An information processing device, comprising:

circuitry configured to:

capture a plurality of images of a user and a peripheral environment of the user;

recognize a plurality of states of the user and the peripheral environment based on the captured plurality of images;

execute a clustering operation on a plurality of function execution instructions of the user, wherein the plurality of function execution instructions includes at least one function execution instruction issued through an utterance of the user;

estimate, as a macro, a cluster that includes the plurality of function execution instructions, based on the recognition and the execution of the clustering operation;

automatically determine a name for the estimated macro, based on the recognition and a first context of the plurality of function execution instructions included in the cluster, wherein acquisition of the first context is at a time of issuance of the plurality of function execution instructions;

control each of a notification of the determined name and presentation of information associated with the estimated macro, to the user; and control registration of the estimated macro in association with the determined name, wherein, the registered macro executes in response to utterance of the determined name by the user, and in a case where the registered macro has a degree of dependency on a second context that is different from the first context used at a time of registration, as a history of execution of the plurality of function execution instructions accumulates, the circuitry is further configured to update the name of the registered macro based on the second context.

2. The information processing device according to claim 1, wherein the circuitry is further configured to determine the name for the estimated macro based on the first context and content of the plurality of function execution instructions included in the cluster.

3. The information processing device according to claim 2, wherein the circuitry is further configured to determine the name of the estimated macro to include a gist of the first context and a gist of the plurality of function execution instructions included in the cluster.

4. The information processing device according to claim 1, wherein the circuitry is further configured to determine, based on a high dependency context among a plurality of acquired contexts, the name for the estimated macro.

5. The information processing device according to claim 1, wherein, in a case where the registered macro is similar to the estimated macro, the circuitry is further configured to determine the name for the estimated macro based on a difference between the estimated macro and the registered macro.

6. The information processing device according to claim 5, wherein the circuitry is further configured to determine the name for the estimated macro based on a difference in a context between the estimated macro and the registered macro, or a difference in the plurality of function execution instructions included in the cluster of the estimated macro and the registered macro.

7. The information processing device according to claim 6, wherein the circuitry is further configured to determine the name for the estimated macro based on a difference in a periodic context between the estimated macro and the registered macro.

8. The information processing device according to claim 6, wherein the circuitry is further configured to
determine the name for the estimated macro based on excessive or deficient function execution instructions between the estimated macro and the registered macro.

9. The information processing device according to claim 1, wherein
the circuitry is further configured to revise the registered macro based on a feedback from the user, and
the feedback is with respect to a function that has been executed based on the registered macro.

10. The information processing device according to claim 9, wherein, in a case where the user gives an instruction to revise an execution content of the function that has been executed based on the registered macro, the circuitry is further configured to create the execution content related to the function that is variable in the registered macro.

11. The information processing device according to claim 9, wherein, in a case where the user gives an instruction to revise an execution content of the function that has been executed based on the registered macro, the circuitry is further configured to update the execution content related to the function in the registered macro.

12. The information processing device according to claim 1, wherein
the circuitry is further configured to estimate, based on a feedback from the user, a new macro that reflects the feedback, and
the feedback is with respect to a function executed based on the registered macro.

13. The information processing device according to claim 1, wherein the circuitry is further configured to estimate the cluster as the macro based on a degree of composition of the cluster or a detection frequency of the cluster.

14. An information processing device, comprising:
circuitry configured to:
control, in a case where a user utters a name of a registered macro, execution of a plurality of functions that corresponds to the registered macro,
capture a plurality of images of the user and a peripheral environment of the user, and
recognize a plurality of states of the user and the peripheral environment based on the captured plurality of images, wherein
the registered macro is based on the recognition and a clustering operation on a plurality of function execution instructions issued by the user,
the plurality of function execution instructions includes at least one function execution instruction issued through an utterance of the user,
the name of the registered macro is automatically determined based on the recognition and a first context of the plurality of function execution instructions,
the first context is a context acquired at a time of issuance of the plurality of function execution instructions, and
in a case where the registered macro has a degree of dependency on a second context that is different from the first context used at a time of registration, as a history of execution of the plurality of function execution instructions accumulates, the circuitry is further configured to update the name of the registered macro based on the second context.

15. The information processing device according to claim 14, wherein, in a case where the first context which is used to determine the name of the registered macro matches a context which is acquired at a point the user makes an utterance for instruction to execute the registered macro, the circuitry is further configured to
cause execution of the plurality of functions corresponding to the registered macro, even in a case where the user has made an utterance with omission of a context wording contained in the name of the registered macro.

16. The information processing device according to claim 14, wherein the circuitry is further configured to control display of an utterance guide that supports execution of the registered macro by the user.

17. The information processing device according to claim 16, wherein the circuitry is further configured to control display of the utterance guide in a case where an intention of an utterance by the user matches at least one of a plurality of intentions defined for the registered macro.

18. An information processing method, comprising:
capturing a plurality of images of a user and a peripheral environment of the user;
recognizing a plurality of states of the user and the peripheral environment based on the captured plurality of images;
executing a clustering operation on a plurality of function execution instructions of the user, wherein the plurality of function execution instructions includes at least one function execution instruction issued through an utterance of the user;
estimating, as a macro, a cluster that includes the plurality of function execution instructions, based on the recognition and the execution of the clustering operation;
automatically determining a name for the estimated macro, based on the recognition and a first context of the plurality of function execution instructions included in the cluster, wherein acquisition of the first context is at a time of issuance of the plurality of function execution instructions;
controlling each of a notification of the determined name and presentation of information associated with the estimated macro, to the user;
controlling registration of the estimated macro in association with the determined name, wherein the registered macro executes in response to utterance of the determined name by the user; and
updating the name of the registered macro based on a second context in a case where the registered macro has a degree of dependency on the second context that is different from the first context used at a time of registration, as a history of execution of the plurality of function execution instructions accumulates.

19. An information processing method, comprising:
controlling, in a case where a user utters a name of a registered macro, execution of a plurality of functions that corresponds to the registered macro;
capturing a plurality of images of the user and a peripheral environment of the user;
recognizing a plurality of states of the user and the peripheral environment based on the captured plurality of images, wherein
the registered macro is based on the recognition and a clustering operation on a plurality of function execution instructions issued by the user;
the plurality of function execution instructions includes at least one function execution instruction issued through an utterance of the user, the name of the registered macro is a name automatically determined based on the recognition and a first context of the plurality of function execution instructions, and the first context is acquired at a time of issuance of the plurality of function execution instructions; and updating the name of the registered macro based on a second context in a case where the registered macro has a degree of dependency on the second context that is different from the first context used at a time of registration, as a history of execution of the plurality of function execution instructions accumulates.

* * * * *